US011622243B2

(12) United States Patent
Burowski et al.

(10) Patent No.: US 11,622,243 B2
(45) Date of Patent: *Apr. 4, 2023

(54) MANY-TO-MANY COMMUNICATION TECHNIQUES FOR MOBILE DEVICES

(71) Applicant: APPLE INC., Cupertino, CA (US)

(72) Inventors: Yagil Burowski, Sunnyvale, CA (US); Robert W. Brumley, Menlo Park, CA (US); Brandon S. Dewberry, San Jose, CA (US)

(73) Assignee: APPLE INC., Cupertino, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/366,933

(22) Filed: Jul. 2, 2021

(65) Prior Publication Data

US 2021/0400441 A1 Dec. 23, 2021

Related U.S. Application Data

(63) Continuation of application No. 17/072,776, filed on Oct. 16, 2020, now Pat. No. 11,082,809.
(Continued)

(51) Int. Cl.
*H04W 4/08* (2009.01)
*H04W 8/00* (2009.01)
(Continued)

(52) U.S. Cl.
CPC ............ *H04W 4/08* (2013.01); *H04W 8/005* (2013.01); *H04W 64/003* (2013.01);
(Continued)

(58) Field of Classification Search
CPC .................................................. H04W 72/12
See application file for complete search history.

(56) References Cited

U.S. PATENT DOCUMENTS

| 6,054,950 A | 4/2000 | Fontana |
| 6,054,980 A | 4/2000 | Eglit |

(Continued)

FOREIGN PATENT DOCUMENTS

| CN | 107113530 | 8/2017 |
| CN | 108780538 | 11/2018 |

(Continued)

OTHER PUBLICATIONS

Office Action issued in European Application No. EP21179830.1, dated Aug. 29, 2022 in 6 pages.
(Continued)

*Primary Examiner* — Cindy Trandai
(74) *Attorney, Agent, or Firm* — Kilpatrick, Townsend and Stockton LLP

(57) ABSTRACT

Certain embodiments are directed to techniques (e.g., a device, a method, or a non-transitory computer readable medium storing code or instructions executable by one or more processors) for many-to-many communication techniques for coordinating communications among a group of mobile devices that can be performed by a first mobile devices. The first mobile device can transmit a request to establish outgoing pairwise ranging sessions with other mobile devices of the group. Each of the mobile devices of the group of mobile devices can establish ranging sessions with the other mobile devices. Each mobile device can act as both an initiating device and a responding device for the ranging session. The first mobile device can detect one or more redundant ranging sessions the mobile devices. The first mobile device can identify whether to keep or terminate each of the one or more redundant ranging sessions based on a common criterion.

20 Claims, 13 Drawing Sheets

Related U.S. Application Data

(60) Provisional application No. 63/040,870, filed on Jun. 18, 2020.

(51) Int. Cl.

| | | |
|---|---|---|
| *H04W 76/15* | (2018.01) | |
| *H04W 80/02* | (2009.01) | |
| *H04W 64/00* | (2009.01) | |
| *H04W 76/14* | (2018.01) | |
| *H04W 4/80* | (2018.01) | |
| *H04W 4/70* | (2018.01) | |

(52) U.S. Cl.
CPC .......... *H04W 76/14* (2018.02); *H04W 76/15* (2018.02); *H04W 80/02* (2013.01); *H04W 4/70* (2018.02); *H04W 4/80* (2018.02)

(56) References Cited

U.S. PATENT DOCUMENTS

| | | | |
|---|---|---|---|
| 8,314,736 | B2 | 11/2012 | Moshfeghi |
| 10,972,196 | B1* | 4/2021 | Chu ................. H04B 17/27 |
| 11,082,809 | B1 | 8/2021 | Burowski et al. |
| 2006/0214848 | A1 | 9/2006 | Roberts |
| 2007/0066323 | A1 | 3/2007 | Park et al. |
| 2012/0230302 | A1* | 9/2012 | Calcev ................ H04W 4/70 370/336 |
| 2014/0073244 | A1 | 3/2014 | Ko et al. |
| 2014/0357194 | A1 | 12/2014 | Jin et al. |
| 2015/0312703 | A1* | 10/2015 | Maldari ............... H04W 8/005 455/41.2 |
| 2017/0055276 | A1 | 2/2017 | Callard et al. |
| 2017/0231016 | A1 | 8/2017 | Park et al. |
| 2017/0279892 | A1 | 9/2017 | Skaaksrud |
| 2017/0280351 | A1 | 9/2017 | Skaaksrud |
| 2019/0116223 | A1* | 4/2019 | Qi ....................... H04W 4/023 |
| 2019/0135229 | A1 | 5/2019 | Ledvina et al. |
| 2019/0391252 | A1 | 12/2019 | Waheed et al. |
| 2019/0394748 | A1* | 12/2019 | Al-kadi ................. H04W 4/80 |
| 2020/0068520 | A1 | 2/2020 | Marri Sridhar et al. |
| 2020/0082370 | A1* | 3/2020 | Yang .................. G06F 3/04847 |
| 2020/0106877 | A1 | 4/2020 | Ledvina et al. |
| 2020/0183000 | A1* | 6/2020 | Li ....................... H04W 84/18 |
| 2020/0196323 | A1* | 6/2020 | Church ............... H04W 40/248 |
| 2020/0275244 | A1* | 8/2020 | Lee ...................... G01S 5/0284 |
| 2020/0380937 | A1 | 12/2020 | Yano |
| 2020/0383036 | A1 | 12/2020 | Abe |
| 2021/0219361 | A1* | 7/2021 | Hada .................... H04W 76/14 |

FOREIGN PATENT DOCUMENTS

| | | |
|---|---|---|
| CN | 110618422 | 12/2019 |
| CN | 111066335 | 4/2020 |
| CN | 112673339 | 4/2021 |
| WO | 2020069311 | 4/2020 |

OTHER PUBLICATIONS

Notice of Allowance issued in U.S. Appl. No. 17/072,776, dated Mar. 31, 2021 in 10 pages (of-record in parent application).
Articled entitled, "Amendment: Enhanced Ultra Wide-Band (UWB) Physical Layers (PHYs) and Associated Ranging Techniques", P802.15.4z™/D04; Draft Standard for Low-Rate Wireless Networks; Lan/Man Standards Committee of the IEEE Computer, server date Oct. 26, 2019; downloaded by EPO on Oct. 27, 2019; BNSDOCID:<XP068155563A_I> in 10 pages.
Article entitled, "Amendment: Enhanced Ultra Wide-Band (UWB) Physical Layers (PHYs) and Associated Ranging Techniques", Draft Standard for Low-Rate Wireless Networks; P802.15.4z™/D04, Oct. 2019; 2019 IEEE BNSDOCID:<XP068155563A_I>, dated Oct. 26, 2019 in 171 pages.
International Search Report and Written Opinion issued in PCT Application No. PCT/US2021/037657, dated Oct. 4, 2021 in 16 pages.
Extended European Search Report issued in European Application No. Application No. EP21179830.1, dated Oct. 4, 2021 in 12 pages.
Office Action issued in China Application No. CN202110671906.6, dated Apr. 6, 2022 in 8 pages.
Office Action issued in China Application No. CN202110671906.6, dated Oct. 10, 2022 in 9 pages.
Notice of Decision to Grant issued in China Application No. CN202110671906.6, dated Jan. 19, 2023 in 2 pages.
International Preliminary Report on Patentability issued in PCT Application No. PCT/US2021/037657, dated Dec. 29, 2022 in 11 pages.

\* cited by examiner

MANY-TO-MANY COMMUNICATION TECHNIQUES FOR MOBILE DEVICES

CROSS-REFERENCES TO RELATED APPLICATIONS

This application is a continuation of U.S. application Ser. No. 17/072,776 filed Oct. 16, 2020 and entitled "Many-To-Many Communication Techniques For Mobile Devices" which claims priority to and incorporates by reference commonly-owned U.S. Provisional Application No. 63/040,870, filed Jun. 18, 2020, entitled "Many-To-Many Communication Techniques For Mobile Devices," in its entirety and for all purposes.

BACKGROUND

Existing many-to-many communication/ranging techniques that involve look-up tables for designating ranging pairs of devices with pre-determined communication windows can become too complex for many applications. These techniques are also complicated for mobile devices entering and leaving ranging/communication sessions. Further, these techniques require determining which device of the many mobile devices is the leader/coordinating device for establishing communication schedules. A typical approach for communication/ranging techniques is to use "random scheduling" where each device in the exchange picks a random delay between transmissions. However, this approach requires all devices to be continually acquiring ("listening") for other devices Various applications of mobile devices utilize the wireless communication techniques to share or exchange information between the devices. For ranging techniques, the primary information exchanges is not data bits alone but the precise time when it was received. Data bits are often, but not required, to be communicated from initiator to responder. Information exchange techniques can be limited on the number of participating devices due to collision between information packet exchanges using a wireless protocol. Previous techniques can require complicated scheduling techniques to minimize packet collisions and account for devices entering and leaving the packet exchanges. In addition, maintaining the device in a powered-on state until the next transmission time can drain the battery of the device.

Techniques for determining range between electronic devices using one-to-one communications is inefficient. These techniques are complicated because the internal clocks of various electronic devices are not synchronized with each other. In some circumstances, an initiating mobile device may provide information concerning the local environment that can be provided to multiple electronic devices. In some cases, users with electronic devices are trying to obtain their range and/or angular measurements from an initiating mobile device. In cases with a single initiating mobile device and multiple receiving devices, communicating in the same bandwidth can result in collisions between the data packets. The collisions can result in missed ranging measurements. It can been advantageous for a technique to allow account for these potential collisions in implementing techniques for efficient ranging techniques.

BRIEF SUMMARY

Certain embodiments are directed to techniques (e.g., a device, a method, a memory or non-transitory computer readable medium storing code or instructions executable by one or more processors) for communication techniques between three or more mobile devices (e.g., a smartphone, a tablet, a wearable device etc.). The communication techniques refer to a mode (e.g., a listening mode for a receiving device and a broadcast mode for a transmitting device). In this way, the number of receiving devices is not as limited as with other communication techniques.

In one aspect, the many-to-many techniques of coordinating communications among a group of mobile devices can be performed by a first mobile device of the group of mobile devices including three or more mobile devices. According to the technique, the first mobile device can transmit, via a first wireless protocol, a request to establish outgoing pairwise ranging sessions with other mobile devices of the group of mobile devices. The pairwise ranging sessions can use a second wireless protocol. The first mobile device can receive, via the first wireless protocol from each of the other mobile device in the group of mobile devices, a request to establish an incoming pairwise ranging session with the other mobile device.

Each of the mobile devices of the group of mobile devices can establish ranging sessions with the other mobile devices. In various embodiments, each mobile device can act as an initiating device for a ranging session and a responding device for the ranging session. The established ranging sessions can result in one or more redundant ranging sessions. For example, a first device can establish a ranging session with a second device as an initiating device and a second ranging sessions with the second device as a responding device. As the ranging sessions can provide the same information, one of the ranging sessions may be considered redundant.

According to the technique, the first mobile device can detect one or more redundant ranging sessions between the first mobile device and one of the other mobile devices. The first mobile device can identify whether to keep or terminate each of the one or more redundant ranging sessions based on a criterion. The mobile device can perform ranging using remaining ranging sessions with each of the other mobile devices.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

Figure 1:
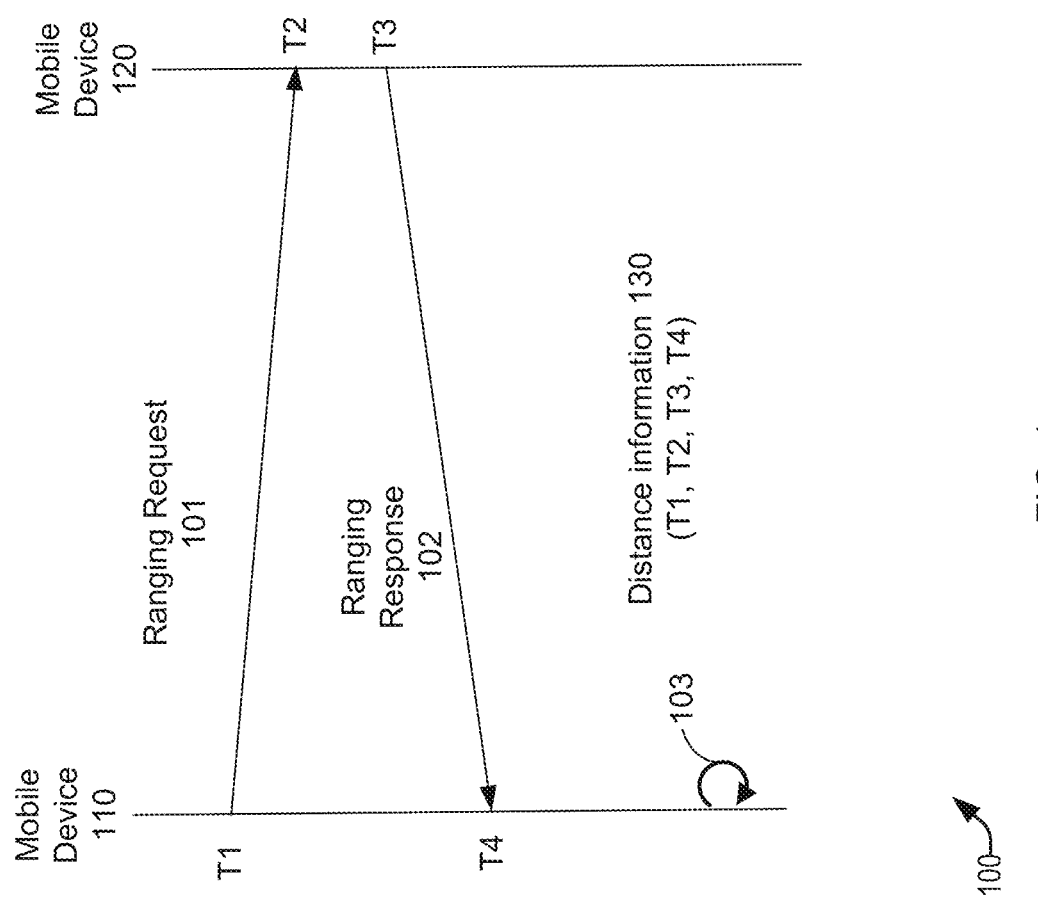
FIG. 1 shows a sequence diagram for performing a ranging measurement between two mobile devices according to embodiments of the present disclosure.

Like reference, symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc., or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Certain embodiments are directed to techniques (e.g., a device, a method, a memory or non-transitory computer readable medium storing code or instructions executable by one or more processors) for many-to-many communication techniques.

In some embodiments, a mobile device can include ranging circuitry that can determine the relative distance between the mobile device and another mobile device. For example, time of flight measurements can be performed using ultra-wideband (UWB) pulses transmitted between the mobile devices. The ranging can provide distance information, which can be used to determine a relative position of one mobile device to another. As examples, the relative position can include a distance value, angular (orientation) information between the two devices, or both.

The ranging functionality can be implemented in combination with another wireless protocols, which can establish an initial communication session, e.g., to perform authentication and/or exchange ranging settings. Additional wireless protocols can also be used, e.g., for transmission of content from one device to the other. For instance, a video or audio file can be transferred from one device to the other after ranging has been performed.

The distance information obtained from the ranging session can be used in a variety of ways. For example, the distance information can be used to display a relative position of the receiving mobile device on a screen of a sending mobile device, which is to send a data item. Such a user interface can allow a user to quickly and accurately select the recipient device for sending the data item, e.g., a video, audio, or a link to an application, as may be used to hand off an application at a particular location (e.g., page) in an application.

The improved many-to-many technique can include several stages. In a first stage, a mobile device sends out a ranging packet that includes mobile device information and designates a number of response windows. The transmission of the ranging packet can be based on the transmission of an advertising signal via a first wireless protocol (e.g., Bluetooth Low Energy). The ranging packet can be transmitted via a second wireless protocol (e.g., Ultra-Wide Band (UWB) signal). The number of response windows can be based on a delta-t from the transmission of the ranging packet. Multiple response windows can be possible to account for packet collision between the initiating devices and responding devices.

A second stage can establish symmetrical communication links between the initiating mobile device and a number of receiving devices. For example assume there are 4 mobile devices for a communication session. If mobile device #1 can be the initiating device, then mobile device #1 can establish communication sessions with mobile devices #2, #3 and #4. Each of the communication sessions can include multiple packet-exchanges between the mobile devices. Mobile device #1 can initiate a communication session with each of devices #2, #3 and #4. Mobile device #2 can initiate a communication session with each of devices #1, #3, and #4. Mobile device #3 can initiate a communication session with each of devices #1, #2, and #4. Mobile device #4 can initiate a communication session with each of devices #1, #2, and #3. These multiple communication sessions can result in multiple redundant communication sessions between the devices. For example, there can be multiple communication sessions between device #1 and #4. One session can be with device #1 as the initiating device and device #4 as the responding device and a second session can be with device #4 as the initiating device and device #1 as the responding device. These multiple communication sessions between pairs of devices may not be efficient.

A third stage (pruning stage) can identify these redundant communication sessions between the mobile devices and eliminate one or more of the redundant sessions to improve efficiency of the communication session. For example, one of the redundant sessions between device #1 and device #4 can be terminated as redundant. Similar redundant communication sessions can be terminated between other devices.

If a new device (e.g., mobile device #5) that is configured for mobile-to-mobile communications enters a communication session, device #5 sends out a many-to-many communication signal. Devices #1, #2, #3, and #4 can receive the ranging signals and start responding to the signal transmitted by device #5. Device #5 can respond to the individual ranging signals transmitted by devices #1, #2, #3, and #4. Finally, a pruning step can take place to reduce redundant communication sessions between the newly added device (e.g., mobile device #5) and the other mobile device.

If one of the participating mobile devices (e.g., devices #1, #2, #3, or #4) leaves the communication session, the departing device (e.g., device #2) will not respond to the communication sessions for devices #1, #3, and #4. After a predetermined number of missed transmitting messages, each of the responding devices (e.g., devices #1, #3, and #4) can terminate responding to the departing device (e.g., device #2).

The one or more mobile devices can transmit a timing signal via a low power wireless protocol (e.g., Bluetooth Low Energy (BLE) advertising). The timing signal can inform one or more other mobile devices of the start of a ranging cycle. The mobile devices can conduct ranging via a predictable schedule starting a predetermined time from the transmission of the timing signal. The schedule for ranging can be generated by the initiating mobile device or it can be hardcoded in the mobile devices.

Having a predetermined time for transmitting information, the initiating device can enter a lower-power mode until just prior to the transmission time. At the predetermined time, the initiating mobile device can initiate transmission and responding devices can initiate reception via a wireless protocol (e.g., UWB protocol). The mobile devices can use the time of reception of the signal from the initiating mobile device to determine range from the initiating mobile device to the device.

I. Ranging/Triangulation Techniques

In some embodiments, a mobile device can include circuitry for performing ranging measurements. Such circuitry can include an antenna and circuitry for processing measured signals. The ranging measurements can be performed using the time-of-flight of pulses between the two mobile devices. In some implementations, a round-trip time (RTT) is used to determine distance information, e.g., for each of the antennas. In other implementations, a single-trip time in one direction can be used. The pulses may be formed using ultra-wideband (UWB) radio technology.

A. Sequence Diagram

FIG. 1 shows a sequence diagram 100 for performing a ranging measurement between two mobile devices according to embodiments of the present disclosure. The two mobile devices may belong to two different users. The two users may know each other, and thus have each other's phone numbers or other identifiers. As described in more detail later, such an identifier can be used for authentication purposes, e.g., so ranging is not performed with unknown devices. Although FIG. 1 shows a single measurement, the process can be repeated to perform multiple measurements over a time interval as part of a ranging session, where such measurements can be averaged or otherwise analyzed to provide a single distance value, e.g., for each antenna.

A first mobile device 110 (e.g., a smartphone) can initiate a ranging measurement (operation) by transmitting a ranging request 101 to a second mobile device 120. Ranging request 101 can include a first set of one or more pulses. The ranging measurement can be performed using a ranging wireless protocol (e.g., UWB). The ranging measurement may be triggered in various ways, e.g., based on user input and/or authentication using another wireless protocol, e.g., Bluetooth low energy (BLE).

At T1, the first mobile device 110 transmits ranging request 101. At T2, the second mobile device 120 receives ranging request 101. T2 can be an average received time when multiple pulses are in the first set. The second mobile device 120 can be expecting the ranging request 101 within a time window based on previous communications, e.g., using another wireless protocol. The ranging wireless protocol and the another wireless protocol can be synchronized so that the second mobile device 120 can turn on the ranging antenna(s) and associated circuitry for a specified time window, as opposed to leaving them on for an entire ranging session.

In response to receiving the ranging request 101, the second mobile device 120 can transmit ranging response 102. As shown, ranging response 102 is transmitted at time T3, e.g., a transmitted time of a pulse or an average transmission time for a set of pulses. T2 and T3 may also be a set of times for respective pulses. Ranging response 102 can include times T2 and T3 so that the first mobile device 110 can compute distance information. As an alternative, a delta between the two times (e.g., T3−T2) can be sent. The ranging response 102 can also include an identifier for the first mobile device 110, an identifier for the second mobile device 120, or both.

At T4, the first mobile device 110 can receive ranging response 102. Like the other times, T4 can be a single time value or a set of time values. Device 110 measures T1 and T4. Device 120 does not need to send them. Device 120 needs to send the T2 and T3 measurements or transmit the difference T3−T2. This can also be a well-known constant delay, eliminating the need to send this information.

At 103, the first mobile device 110 computes distance information 130, which can have various units, such as distance units (e.g., meters) or as a time (e.g., milliseconds). Time can be equivalent to a distance with a proportionality factor corresponding to the speed of light. In some embodiments, a distance can be computed from a total round-trip time, which may equal T2−T1+T4−T3. In some embodiments, the processing time for the second mobile device 120 can also be subtracted from the total round-trip time. More complex calculations can also be used, e.g., when the times correspond to sets of times for sets of pulses and when a frequency correction is implemented.

B. Triangulation

In some embodiments, a mobile device can have multiple antennas, e.g., to perform triangulation. The separate measurements from different antennas can be used to determine a two-dimensional (2D) position, as opposed to a single distance value that could result from anywhere on a circle/sphere around the mobile device. The two-dimensional (2D) position can be specified in various coordinates, e.g., Cartesian or polar, where polar coordinates can comprise an angular value and a radial value.

Figure 2:
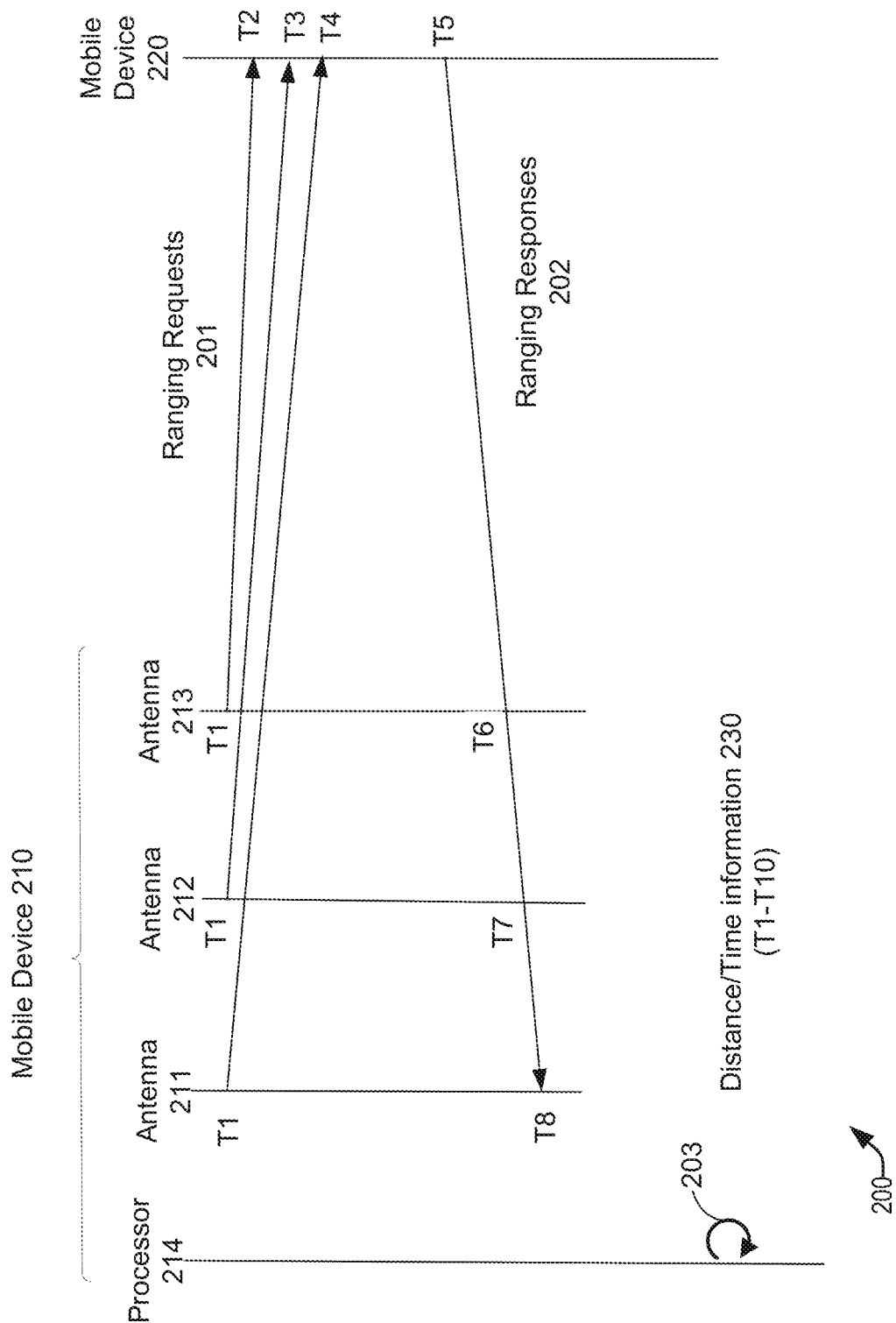
FIG. 2 shows a sequence diagram of a ranging operation involving a mobile device having three antennas according to embodiments of the present disclosure.

FIG. 2 shows a communication group 200 of a ranging operation involving a mobile device 210 having three antennas 211, 212, and 213 according to embodiments of the present disclosure. Antennas 211, 212, 213 can be arranged to have different orientations, e.g., to define a field of view for performing ranging measurements.

In this example of FIG. 2, each of antennas 211, 212, 213 transmits a packet (including one or more pulses) that is received by mobile device 220. These packets can be part of ranging requests 201. The packets can each be transmitted at time T1, although they can be transmitted at different times in other implementations.

In some embodiments, mobile device 220 can have multiple antennas itself. In such an implementation, an antenna of mobile device 210 can send a packet to a particular antenna (as opposed to a broadcast) of mobile device 220, which can respond to that particular packet. Mobile device 220 can listen at a specified antenna so that both devices know which antennas are involved, or a packet can indicate which antenna a message is for. For example, a first antenna can respond to a received packet; and once the response is received, another packet can be sent to a different antenna. Such an alternative procedure may take more time and power.

The three packets of ranging requests 201 can be received at times T2, T3, and T4, respectively. Thus, the antenna(s) (e.g., UWB antennas) of mobile device 220 can listen at substantially the same time and respond independently. Mobile device 220 provides a ranging response 202, sent at times T5, respectively. Mobile device 210 receives the ranging responses at times T6, T7, and T8, respectively.

At 203, processor 214 of mobile device 210 computes distance information 230, e.g., as described herein. Processor 214 can receive the times from the antennas and more specifically from circuitry (e.g., UWB circuitry), that analyzes signals from antennas 211, 212, 213. As described later, processor 214 can be an always-on processor that uses less power than an application processor that can perform functionality that is more general. Distance information 230 can be used to determine a 2D or 3D position of mobile device 220, where such position can be used to configure a display screen of mobile device 210. For instance, the position can be used to determine where to display an icon corresponding to mobile device 220, e.g., which position in a list, which position in a 2D grid, or in which cluster of 1D, 2D, or 3D distance/position ranges to display the icon.

In some embodiments, to determine which ranging response is from which antenna, mobile device 220 can inform mobile device 210 of the order of response messages that are to be sent, e.g., during a ranging setup handshake, which may occur using another wireless protocol.

In other embodiments, the ranging responses can include identifiers, which indicate which antenna sent the message. These identifiers can be negotiated in a ranging setup handshake.

Messages in ranging requests 201 and ranging responses 202 can include very little data in the payload, e.g., by including few pulses. Using few pulses can be advantageous. The environment of a mobile device (potentially in a pocket) can make measurements difficult. As another example, an antenna of one device might face a different direction than the direction from which the other device is approaching. Thus, it is desirable to use high power for each pulse, but there are government restrictions (as well as battery concerns) on how much power can be used within a specified time window (e.g., averaged over one millisecond). The packet frames in these messages can be about 150 to 180 microseconds long.

II. Pairwise Ranging and Removal of Redundant Sessions

Mobile devices may use GPS or other location circuitry to determine the location of the mobile device. For example, a map application can show an approximate location of the mobile device on a map. But, such techniques for determining location are typically determined relative to some external reference frame that is fixed, and not to a variable reference frame, e.g., another mobile device.

In some embodiments, a mobile device can include ranging circuitry that can determine the relative distance between the mobile device and another mobile device. For example, time of flight measurements can be performed using ultra-wideband (UWB) pulses transmitted between the mobile devices. The ranging can provide distance information, which can be used to determine a relative position of one mobile device to another. As examples, the relative position can include a distance value, angular (orientation) information between the two devices, or both.

Ranging techniques between mobile devices face challenges due to synchronization of the clocks between devices and collisions between messages on the same channel. Techniques can be implemented to reduce the number of collisions between ranging messages by reducing the number of redundant ranging sessions between devices. After establishing a number of ranging sessions between mobile devices, the techniques can include determining a number of redundant ranging sessions and deciding whether to keep or eliminate the redundant ranging sessions. These techniques allow mobile devices to enter and leave communications sessions without complex routines for adding or removing the mobile device. Further each device can establish ranging sessions between the other mobile devices without needed to establish a coordinator device among the mobile devices.

In some embodiments, the ranging techniques can use multiple protocols. For example, an authentication and setup phase can be implemented using a first wireless protocol (e.g., BLE or other Bluetooth). A second (ranging) wireless protocol can be used to perform ranging measurements. The ranging techniques can be used to share information between devices with a predefined distance for applications such as augmented reality. This disclosure also provides details regarding the mobile devices that perform ranging techniques.

The ranging functionality can be implemented in combination with another wireless protocol, which can establish an initial communication session, e.g., to perform authentication and/or exchange ranging settings. Additional wireless protocols can also be used, e.g., for transmission of content from one device to the other. For instance, a video or audio file can be transferred from one device to the other after ranging has been performed.

A. Establishing Independent Connections for Many-to-Many Ranging Exchanges

Figure 3:
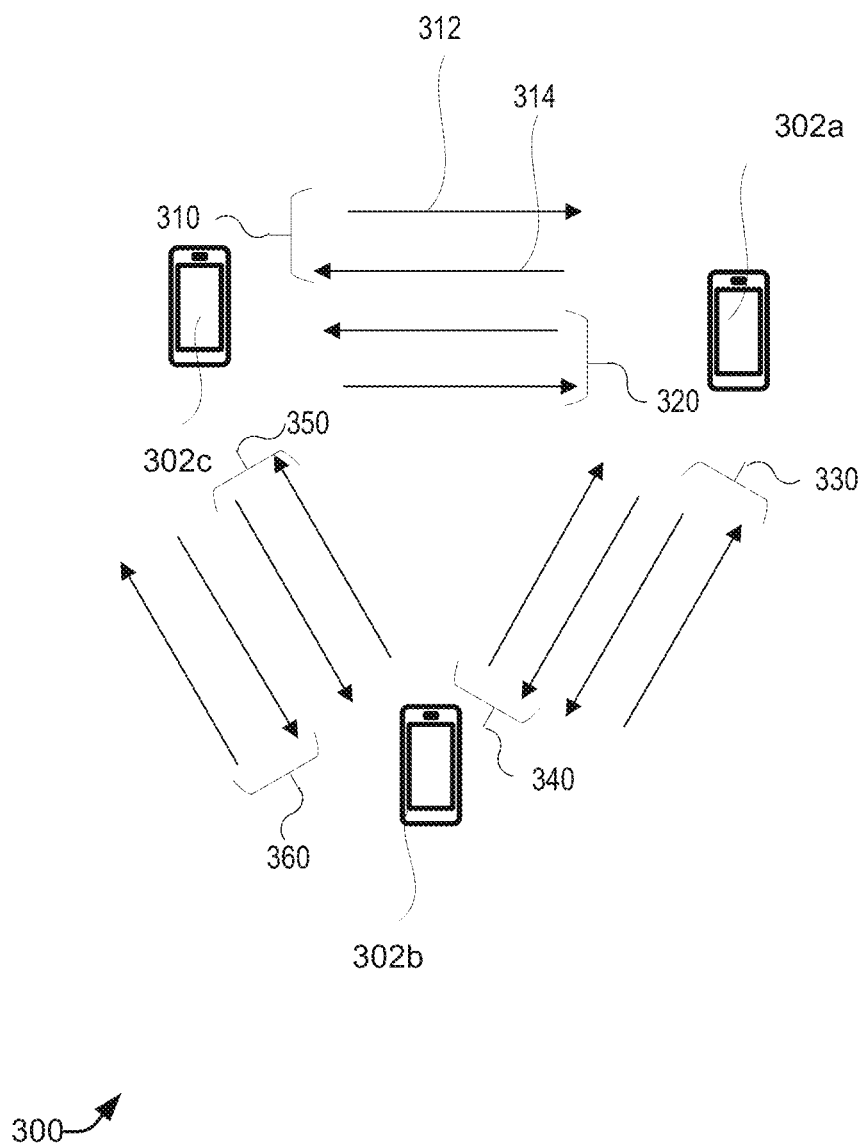
FIG. 3 illustrates ranging exchanges with redundant exchanges between multiple mobile devices

FIG. 3 illustrates an exemplary ranging exchange 300 including pairwise ranging exchanges between multiple mobile devices. Some of the ranging exchanges are redundant. While FIG. 3 illustrates three mobile devices 302a, 302b, 302c, any number of devices exceeding three devices can employ these techniques. Each of the mobile devices 302a, 302b, and 302c can act as an initiating device and/or a responding device during ranging sessions. For example, a first ranging session 310 can be between a first mobile device 302a and a third mobile device 302c. In the first ranging session 310, the third mobile device 302c can be the initiating device by transmitting a ranging request 312. The first mobile device 302a can transmit a response 314 to the ranging request 312. During the first ranging session 310, the third mobile device 302c can calculate a distance between the devices using the two-way time of flight (TWTOF) time. The third mobile device 302a can transmit the calculated distance to the first mobile device 302a via a third packet exchange (not shown in FIG. 3). Alternatively, the calculated distance between the third mobile device 302c and the first mobile device 302a or the TWTOF time can be sent to the first mobile device 302a using a different communication path (e.g., BLE). The first mobile device 302a can calculate the distance between the first mobile device 302a and the third mobile device 302c using the TWTOF. While the first ranging session 310 illustrates a single bi-directional packet exchange between the mobile devices, in various embodiments two or more bi-directional packet exchanges can occur during the first ranging session 310 time period.

In a second ranging session 320, the first mobile device 302a acts as an initiating device by transmitting a ranging request. The third mobile device 302c can respond to the ranging request from the first mobile device 302a. The second ranging session 320 can occur before, after, or simultaneously with the first ranging session 310. The first ranging session 310 and the second ranging session 320 can be established independently of each other. In this way there is no need to establish a coordinator for either the first ranging session 310 or the second ranging session 320 or for any ranging session illustrated in FIG. 3 or as described for the techniques described herein. During the second ranging session 320, the first mobile device 302c can calculate a distance between the devices using the two-way time of flight (TWTOF) time. The first mobile device 302a can transmit the calculated distance to the third mobile device 302c via a third packet exchange (not shown in FIG. 3). Alternatively, the calculated distance between the first mobile device 302a and the third mobile device 302c or the TWTOF time can be sent to the third mobile device 302c using a different communication path (e.g., BLE). The third mobile device 302c can calculate the distance between the third mobile device 302c and the first mobile device 302a using the TWTOF. While the second ranging session 320 illustrates a single bi-directional packet exchange between the mobile devices, in various embodiments two or more bi-directional packet exchanges can occur during the second ranging session 320 time period.

In a third ranging session 330, the first mobile device 302a can be the initiating device and the second mobile device 302b can be the responding device. During the third ranging session 330, the first mobile device 302a can calculate a distance between the devices using the two-way time of flight (TWTOF) time. The first mobile device 302a can transmit the calculated distance to the second mobile device 302b via a third packet exchange (not shown in FIG. 3).

Alternatively, the calculated distance between the first mobile device 302a and the second mobile device 302b or the TWTOF time can be sent to the second mobile device 302b using a different communication path (e.g., BLE). The second mobile device 302b can calculate the distance between the first mobile device 302a and the second mobile device 302b using the TWTOF. While the third ranging session 330 illustrates a single bi-directional packet exchange between the mobile devices, in various embodiments two or more bi-directional packet exchanges can occur during the third ranging session 330 time period.

In a fourth ranging session 340, the second mobile device 302b can initiate a ranging session and the first mobile device 302a can respond. During the fourth ranging session 340, the second mobile device 302b can calculate a distance between the devices using the two-way time of flight (TWTOF) time. The second mobile device 302b can transmit the calculated distance to the first mobile device 302a via a third packet exchange (not shown in FIG. 3). Alternatively, the calculated distance between the second mobile device 302b and the first mobile device 302b or the TWTOF time can be sent to the first mobile device 302a using a different communication path (e.g., BLE). The first mobile device 302a can calculate the distance between the second mobile device 302b and the first mobile device 302a using the TWTOF. While the fourth ranging session 340 illustrates a single bi-directional packet exchange between the mobile devices, in various embodiments two or more bi-directional packet exchanges can occur during the fourth ranging session 340 time period.

In a fifth ranging session 350, the third mobile device 302c can initiate a ranging request with a second mobile device 302b and the second mobile device 302b can respond. During the fifth ranging session 350, the third mobile device 302c can calculate a distance between the devices using the two-way time of flight (TWTOF) time. The third mobile device 302c can transmit the calculated distance to the second mobile device 302b via a third packet exchange (not shown in FIG. 3). Alternatively, the calculated distance between the third mobile device 302c and the second mobile device 302b or the TWTOF time can be sent to the second mobile device 302b using a different communication path (e.g., BLE). The second mobile device 302b can calculate the distance between the third mobile device 302c and the second mobile device 302b using the TWTOF. While the fifth ranging session 350 illustrates a single bi-directional packet exchange between the mobile devices, in various embodiments two or more bi-directional packet exchanges can occur during the fifth ranging session 350 time period.

In a sixth ranging session 360, the second mobile device 302b can initiate a ranging request with a third mobile device 302c and the third mobile device 302c can respond. During the sixth ranging session 360, the second mobile device 302b can calculate a distance between the devices using the two-way time of flight (TWTOF) time. The second mobile device 302b can transmit the calculated distance to the third mobile device 302c via a third packet exchange (not shown in FIG. 3). Alternatively, the calculated distance between the second mobile device 302b and the third mobile device 302c or the TWTOF time can be sent to the third mobile device 302c using a different communication path (e.g., BLE). The third mobile device 302c can calculate the distance between the third mobile device 302c and the second mobile device 302b using the TWTOF. While the sixth ranging session 360 illustrates a single bi-directional packet exchange between the mobile devices, in various embodiments two or more bi-directional packet exchanges can occur during the sixth ranging session 360 time period.

As illustrated in FIG. 3, there exists redundant ranging sessions between the devices. For example, the range between the first mobile device 302a and the third mobile device 302c can be determined by either the first ranging session 320 or the second ranging session 310. Therefore, one of the two ranging sessions is redundant and can be pruned or eliminated.

B. Pruning Redundant Communication Exchanges

Figure 4:
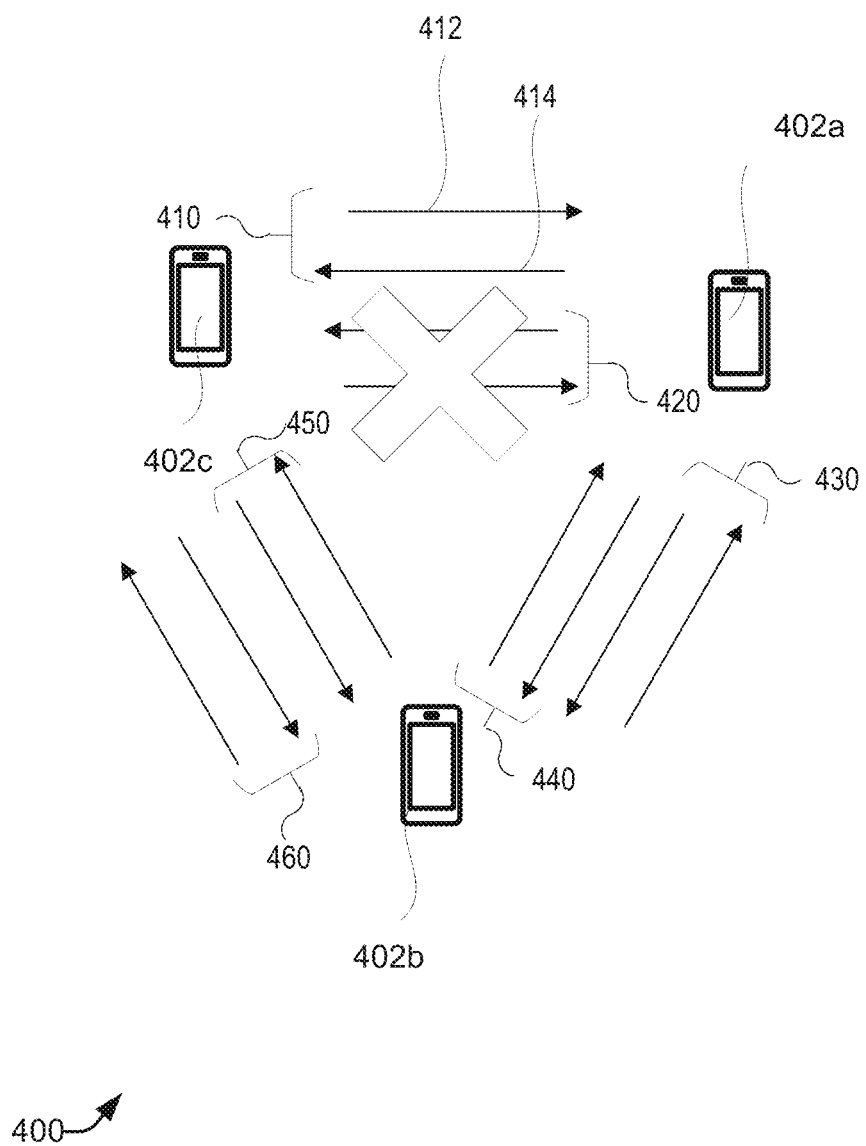
FIG. 4 illustrates pruning a redundant ranging exchange in a communications session.

FIG. 4 illustrates pruning a redundant ranging exchange 400 in a communications session. The ranging exchange 400 of FIG. 4 is similar to the exemplary exchange of FIG. 3 with the additional aspects of reducing one or more redundant ranging sessions. FIG. 4 illustrates an exemplary ranging exchange 400 having redundant ranging exchanges between multiple mobile devices. While FIG. 4 illustrates three mobile devices 402a, 402b, and 402c, any number of devices exceeding three devices can employ these techniques. Each of the mobile devices 402a, 402b, and 402c can act as an initiating device and a responding device during ranging sessions. For example, a first ranging session 410 between a first mobile device 402a and a third mobile device 402c. In the first ranging session 410, the third mobile device 402c can be the initiating device by transmitting a ranging request 412. The first mobile device 402a can transmit a response 414 to the ranging request 412. During the first ranging session 410, the third mobile device 402c can calculate a distance between the devices using the two-way time of flight (TWTOF) time. The third mobile device 402a can transmit the calculated distance to the first mobile device 402a via a third packet exchange (not shown in FIG. 4). Alternatively, the calculated distance between the third mobile device 402c and the first mobile device 402a or the TWTOF time can be sent to the first mobile device 402a using a different communication path (e.g., BLE). The first mobile device 402a can calculate the distance between the first mobile device 402a and the third mobile device 402c using the TWTOF. While the first ranging session 410 illustrates a single bi-directional packet exchange between the mobile devices, in various embodiments two or more bi-directional packet exchanges can occur during the first ranging session 410 time period.

In a second ranging session 420, the third mobile device 402c acts as an initiating device by transmitting a ranging request to the first mobile device 402a. The first mobile device 402a can respond to the ranging request from the third mobile device 402c. During the second ranging session 420, the first mobile device 402c can calculate a distance between the devices using the two-way time of flight (TWTOF) time. The first mobile device 402a can transmit the calculated distance to the third mobile device 402c via a third packet exchange (not shown in FIG. 4). Alternatively, the calculated distance between the first mobile device 402a and the third mobile device 402c or the TWTOF time can be sent to the third mobile device 402c using a different communication path (e.g., BLE). The third mobile device 402c can calculate the distance between the third mobile device 402c and the first mobile device 402a using the TWTOF. While the second ranging session 420 illustrates a single bi-directional packet exchange between the mobile devices, in various embodiments two or more bi-directional packet exchanges can occur during the second ranging session 420 time period.

In a third ranging session 430, the first mobile device 402a can be the initiating device and the second mobile device 402b can be the responding device. During the third ranging session 430, the first mobile device 402a can calculate a distance between the devices using the two-way time of flight (TWTOF) time. The first mobile device 402a can transmit the calculated distance to the second mobile device 402b via a third packet exchange (not shown in FIG. 4).

Alternatively, the calculated distance between the first mobile device 402a and the second mobile device 402b or the TWTOF time can be sent to the second mobile device 402b using a different communication path (e.g., BLE). The second mobile device 402b can calculate the distance between the first mobile device 402a and the second mobile device 402b using the TWTOF. While the third ranging session 430 illustrates a single bi-directional packet exchange between the mobile devices, in various embodiments two or more bi-directional packet exchanges can occur during the third ranging session 430 time period.

In a fourth ranging session 440, the second mobile device 402b can initiate a ranging session and the first mobile device 402a can respond. During the fourth ranging session 440, the second mobile device 402b can calculate a distance between the devices using the two-way time of flight (TWTOF) time. The second mobile device 402b can transmit the calculated distance to the first mobile device 402a via a third packet exchange (not shown in FIG. 4). Alternatively, the calculated distance between the second mobile device 402b and the first mobile device 402b or the TWTOF time can be sent to the first mobile device 402a using a different communication path (e.g., BLE). The first mobile device 402a can calculate the distance between the second mobile device 402b and the first mobile device 402a using the TWTOF. While the fourth ranging session 440 illustrates a single bi-directional packet exchange between the mobile devices, in various embodiments two or more bi-directional packet exchanges can occur during the fourth ranging session 440 time period.

In a fifth ranging session 450, the third mobile device 402c can initiate a ranging request with a second mobile device 402b and the second mobile device 402b can respond. During the fifth ranging session 450, the third mobile device 402c can calculate a distance between the devices using the two-way time of flight (TWTOF) time. The third mobile device 402c can transmit the calculated distance to the second mobile device 402b via a third packet exchange (not shown in FIG. 4). Alternatively, the calculated distance between the third mobile device 402c and the second mobile device 402b or the TWTOF time can be sent to the second mobile device 402b using a different communication path (e.g., BLE). The second mobile device 402b can calculate the distance between the third mobile device 402c and the second mobile device 402b using the TWTOF. While the fifth ranging session 450 illustrates a single bi-directional packet exchange between the mobile devices, in various embodiments two or more bi-directional packet exchanges can occur during the fifth ranging session 450 time period.

In a sixth ranging session 460, the second mobile device 402b can initiate a ranging request with a third mobile device 402c and the third mobile device 402c can respond. During the sixth ranging session 460, the second mobile device 402b can calculate a distance between the devices using the two-way time of flight (TWTOF) time. The second mobile device 402b can transmit the calculated distance to the third mobile device 402c via a third packet exchange (not shown in FIG. 4). Alternatively, the calculated distance between the second mobile device 402b and the third mobile device 402c or the TWTOF time can be sent to the third mobile device 402c using a different communication path (e.g., BLE). The third mobile device 402c can calculate the distance between the third mobile device 402c and the second mobile device 402b using the TWTOF. While the sixth ranging session 460 illustrates a single bi-directional packet exchange between the mobile devices, in various embodiments two or more bi-directional packet exchanges can occur during the sixth ranging session 460 time period.

FIG. 4 illustrates that the technique can detect that there is a redundant ranging session between the first mobile device 402a and the third mobile device 402c. The second ranging session 420 can be considered redundant if the first mobile device 402a receives the distance between the devices or the TWTOF via a third communication exchange or via a different communications path. The redundant ranging session (here, the second ranging session 420) between the third mobile device 402c and first mobile device 402a can be designated as the redundant ranging session. Once detected, one of the ranging sessions of the first ranging session 410 and the second ranging session 420 can be kept or eliminated. Similarly, one of the ranging sessions between the first mobile device 402a and the second mobile device 402b can be designated as redundant. Similarly, one of the ranging sessions between the second mobile device 402b and the third mobile device 402c can be designated as redundant.

The decision whether to keep or terminate each of the one or more redundant ranging sessions can be based on a common criteria shared amount the group of mobile devices. The common criteria comprises a media access control (MAC) address for the device. A media access control address is a unique identifier assigned to a network interface controller for use as a network address in communications within a network segment. The MAC address can be used in IEEE 802 networking technologies, including Ethernet, Wi-Fi, and Bluetooth. The common criteria can be an identifier for the mobile device or a portion of an identifier for the mobile device. The identifier for the device can be an International Mobile Equipment Identity (IMEI) number. The IMEI number is a unique identification or serial number that all mobile phones and smartphones have. The IMEI number can normally be 15 digits long. A portion of the identifier can be the last five digits of the identifier.

The first ranging session 410 can be eliminated by informing the transmitting device (here, the first mobile device 402a) in the second ranging session 420 to cease transmitting the ranging request.

In various embodiments, each of the redundant ranging sessions can determine which ranging session of the pair is redundant. In various embodiments, some but not all of the redundant ranging sessions can be eliminated. In some embodiments, all of the redundant ranging sessions can be eliminated.

Figure 5:
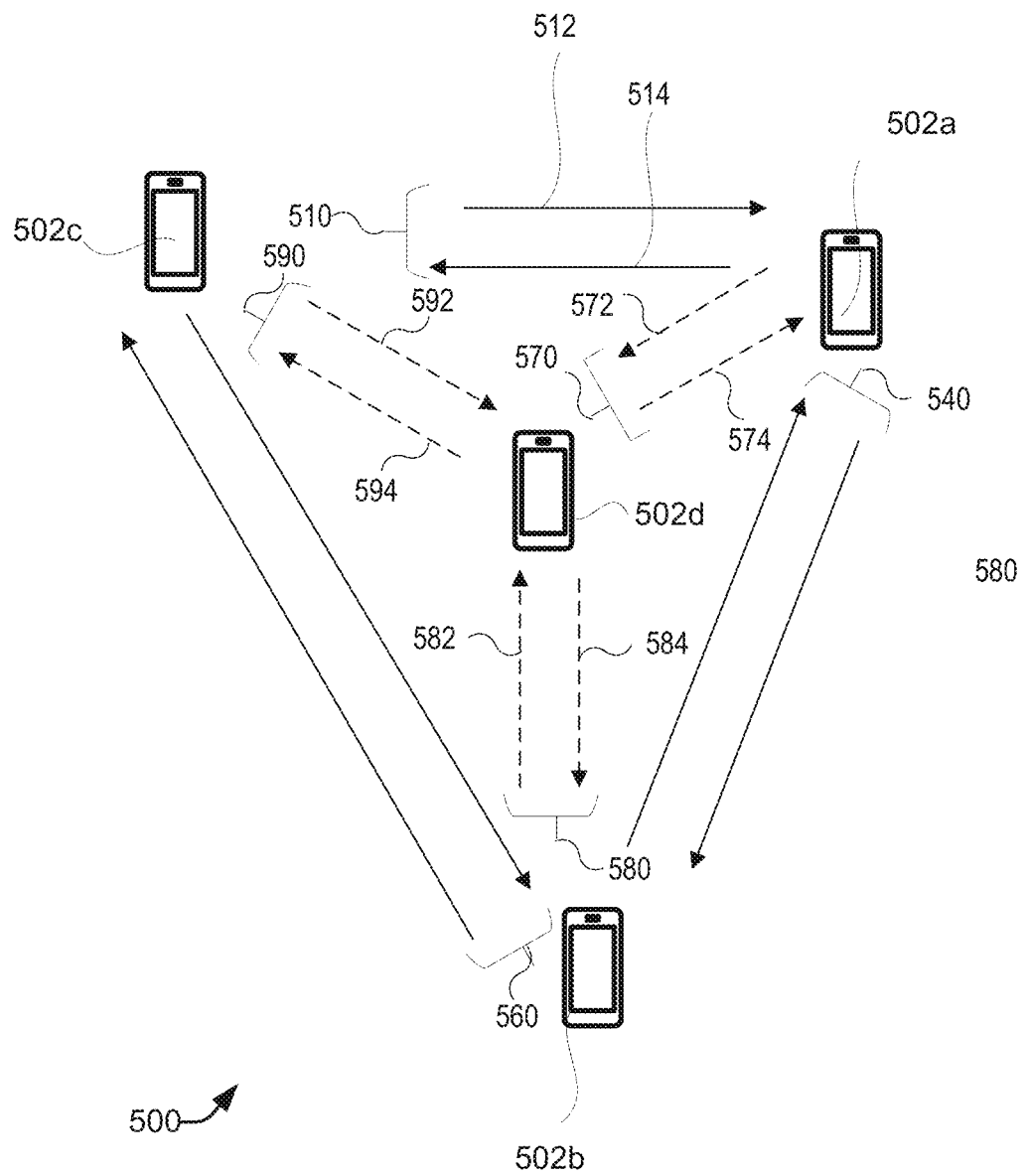
FIG. 5 illustrates an efficient ranging exchange communication session.

FIG. 5 illustrates an efficient ranging exchange 500 communication session. FIG. 5 illustrates an exemplary efficient ranging exchange 500 without any redundant ranging exchanges between the multiple mobile devices. According to the techniques described herein, not all redundant ranging sessions need to be terminated. However, the most efficient ranging technique between the mobile devices is one wherein there exists only one ranging sessions between a pair of devices. It does not matter if a particular mobile device acts as initiating device or a responding device.

While FIG. 5 illustrates three mobile devices 502a, 502b, and 502c, any number of devices exceeding three devices can employ these techniques. Each of the mobile devices 502a, 502b, and 502c can act as an initiating device and a responding device to ranging requests. For example, a first ranging session 510 between a first mobile device 502a and a third mobile device 502c. In the first ranging session 510, the third mobile device 502c can be the initiating device by transmitting a ranging request 512. The first mobile device 502a can transmit a response 514 to the ranging request 512. While the first ranging session 510 illustrates a single bi-directional packet exchange between the mobile devices, in various embodiments two or more bi-directional packet exchanges can occur during the first ranging session 510 time period.

In a fourth ranging session 540, the second mobile device 502b can initiate a ranging session and the first mobile device 502a can respond. In a sixth ranging session 560, the second mobile device 502b can initiate a ranging request with a third mobile device 502c and the third mobile device 502c can respond.

Figure 7:
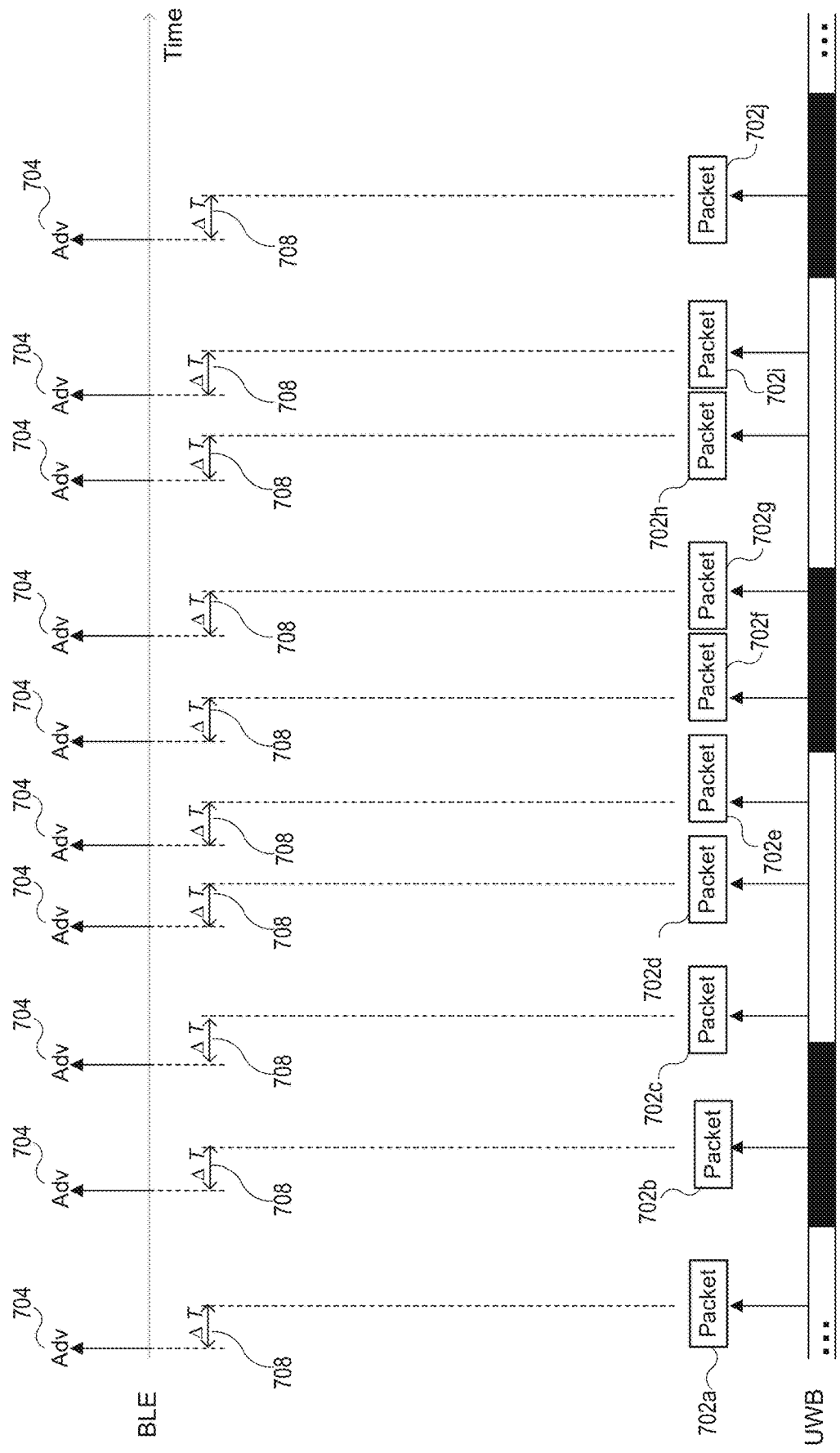
FIG. 7 illustrates an exemplary flowchart for many-to-many communication techniques.

FIG. 5 also illustrates a fourth mobile device 502d joining the ranging session. Although the fourth mobile device 502d is depicted between the three other mobile devices such geometry is not required. The fourth mobile device 502d can receive the advertising signals (not shown) from the three other mobile devices and listen for the ranging signals 572, 582, 592 from each of the three other mobile devices 502a, 502b, and 502c. FIG. 7 illustrates a seventh ranging session 570 between the first mobile device 502a and the fourth mobile device 502d. The second mobile device 502b can range with the fourth mobile device 502d as part of an eighth ranging session 580. The fourth mobile device 502d can range with the third mobile device 502c as part of a ninth ranging session 590. The fourth mobile device 502d can select a response slot of the plurality of response slots for each of the three mobile device ranging sessions and transmit a response message 574, 584, 594 accordingly. The response slots can be at predetermined time intervals.

FIG. 5 illustrates an efficient ranging technique because there are no redundant ranging sessions between devices. The reduction of redundant ranging sessions saves each of the devices battery power and reduces the number of potential collisions between data packets.

C. Ranging Techniques Performed by Mobile Devices

Figure 6:
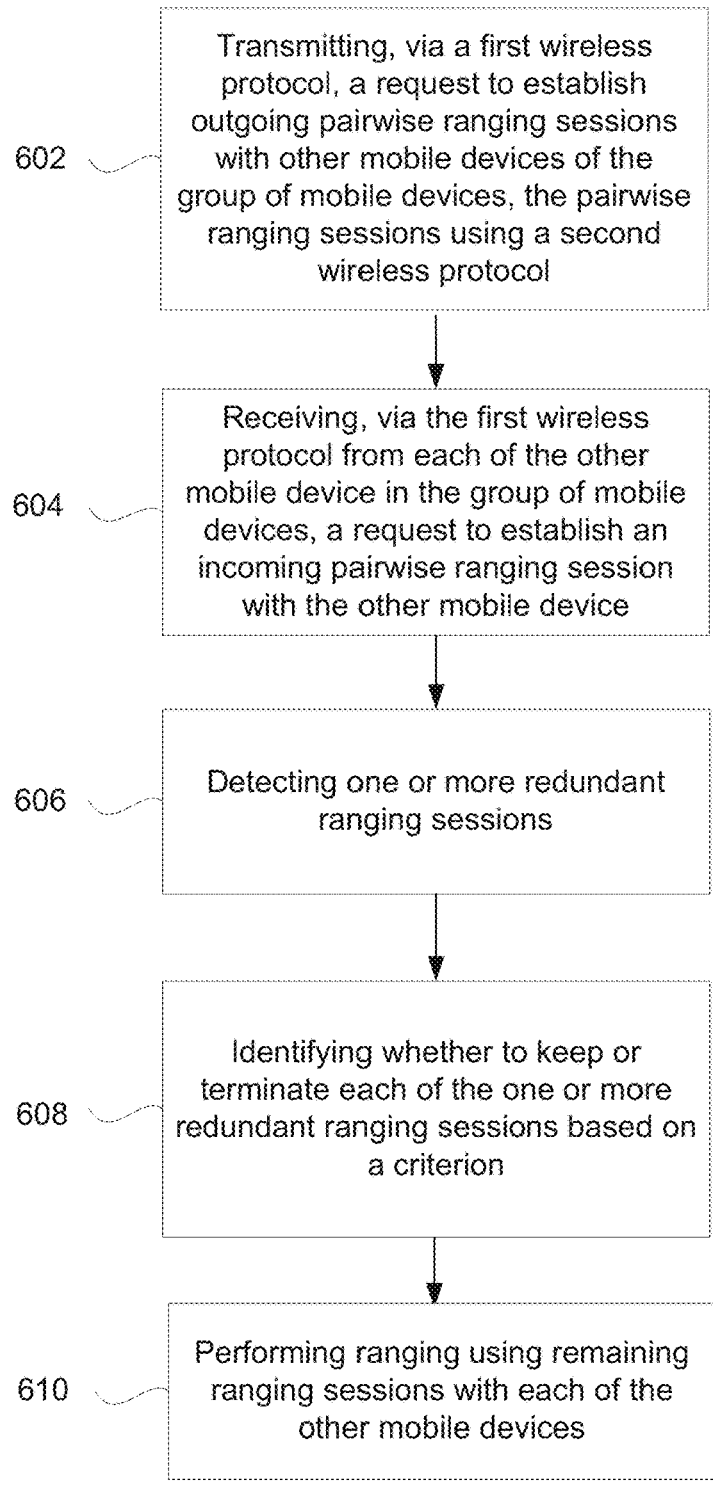
FIG. 6 illustrates an exemplary sequence diagram for establishing timing for many-to-many communication techniques.

FIG. 6 illustrates an exemplary flowchart for a communication techniques performed by multiple computing devices. Method 600 can be used to determine a spatial relationship of three or more mobile devices to each of the other mobile devices.

At 602, the technique can include transmitting, via a first wireless protocol, a request to establish outgoing pairwise ranging sessions with other mobile devices of the group of mobile devices. The request can be the advertising messages 704 as shown in FIG. 7. The first wireless protocol can be a low power wireless protocol (e.g., advertising signal of Bluetooth Low Energy). The transmission of the request to establish pairwise ranging sessions can be received by one of more mobile devices within range of the first wireless protocol signal.

In various embodiments, a transmission schedule for the advertising packets can be transmitted randomly or pseudo randomly. The transmission schedule can specify a time delay from the advertising packet transmission until the next ranging packet transmission. The one or more receiving devices can receive the advertising packets. The advertising packets can include information concerning the identity of the transmission device. The advertising packets can include the schedule for transmission of ranging packets. The one or more receiving device can use the advertising packets as a timing signal to calculate a transmission time for ranging packets.

The ranging messages can include a schedule for responding for one or more mobile devices. The schedule can include one or more time delays following the receipt of the ranging message. The responding device can randomly select one of the response timeslots to respond to the mobile device. The response message can include a time of receipt of the ranging message. The response message can include an identifier for the responding message. The response message can include a rough range calculation between the first mobile device and the second mobile device. The responding mobile device can use a time in the ranging message to calculate a rough range between the initiating and responding mobile device.

In various embodiments the ranging message can include information concerning the transmitting mobile device (e.g., device identifier). The request can include a time delay (Δt) 708, as shown in FIG. 7, following the reception of the request to begin a pairwise ranging session. This allows the receiving mobile devices to determine a listening window to receive a ranging message from the initiating mobile device. The pairwise ranging sessions can occur using a second wireless protocol. The second wireless protocol can be ultra-wideband transmissions.

At 604, the technique can include receiving, via the first wireless protocol from each of the other mobile devices in the group of mobile devices, a request to establish an incoming pairwise ranging session with the other mobile device. The request from each of the other mobile devices in the group of mobile devices can include an identifier of the mobile device in the request. The identifier can include an IMEI or MAC address. The identifier of the mobile device can be used to specify which mobile device of the multiple mobile devices transmitted the request message. The mobile device can use the time of the reception of the request to establish a listening window for receiving one or more ranging messages.

Each of the mobile devices can establish a ranging session with each of the other mobile devices as illustrated in FIG. 3. Each mobile device can function an initiating device and a responding device as shown in FIG. 3. Therefore multiple ranging sessions (e.g., the first ranging session 310 and the second ranging session 320) can be established between the mobile devices.

At 606, the technique can include detecting one or more redundant ranging sessions. Each mobile device can receive an identifier for the other mobile devices it is ranging with. For example, a first mobile device 302a, shown in FIG. 3 can receive an identifier for the second mobile device 302b and the third mobile device 302c. The identifier can be an IMEI number or a portion of an IMEI of the mobile device. The identifiers can be stored in a memory of the mobile device.

A processor of the mobile device can access the memory to determine if the mobile device is acting an initiating device to a certain mobile device identifier. The processor can also determine if the mobile device is acting as a responding device to a certain device identifier. If the mobile device is acting as both an initiating device and responding device to the same mobile device identifier, then a redundant ranging session exists. For example, as shown in FIG. 3, the first mobile device is acting an initiating device for the second ranging session 320 and a responding device for the first ranging session 310. As the first mobile device is acting as both an initiating and responding device with the same mobile device (i.e., the third mobile device 302c) a redundant ranging session exists between the devices.

Each ranging session can include multiple pairwise message exchanges between the devices. For each ranging session, one mobile device is the initiating device. The initiating device transmits the ranging message. The second mobile device in the ranging session is the responding device. The responding mobile device receives the ranging message and transmits a response message. The response message can include an identifier of the responding device. In some embodiments, the response message can include the time of the response. The initiating mobile device can receive the response message and calculate a range between the devices. In various embodiments, multiple pairwise message exchanges can occur during a ranging session.

In various embodiments, a first mobile device can act as both the initiating device and a responding device in a pairwise message exchange with a second mobile device. These ranging sessions can be considered symmetrical links and collectively may comprise two or more symmetrical links. The symmetrical links can comprise one or more two-way data packet exchanges. As the first pairwise message exchange can be adequate for determining a range between the first device and the second device, one of the two ranging sessions can be considered redundant. Redundant links are inefficient because it results in additional power required from each of the devices and the additional ranging messages can increase the number of data packet collisions in the same frequency bandwidth.

At 608, the technique can include identifying whether to keep or terminate each of the one or more redundant ranging sessions based on a criterion. Under certain circumstances, the processor may decide to maintain one or more redundant links, even if there are some inefficiencies. This decision not to prune redundant links may be based on the available bandwidth or quality of received signals. The criterion can be a common criterion shared among the group of mobile devices.

In some embodiments, a first mobile device can communicate to a second mobile device using an in-band (e.g., UWB) or out of band (e.g., BLE) protocol to communicate loading on the transceiver for the first mobile device in order to reduce one or more redundant ranging sessions between the devices. The devices can randomly select which of the redundant ranging sessions to prune. The characteristics of the mobile devices (e.g., a Media Access Control (MAC) address) can be used to determine which ranging session to prune. The common criteria can include an identifier (e.g., IMEI) for a mobile device. The common criteria can include all or a portion of the identifier for the mobile device to determine which ranging session to prune. For example, in an embodiment, the initiating device with lower numerical ranging session can be pruned. Alternatively, the initiating device with the higher numerical number can be pruned.

At 610, the technique can include performing ranging using remaining ranging sessions with each of the other mobile devices. The ranging techniques can be accomplished by using the roundtrip time between the transmission time of the ranging request and the time of receiving the response to determine a range between the devices. The response message can be received by multiple antennas on the first mobile device. Each of the multiple antennas on the first mobile device may receive the response message at a different time based at least on the orientation of the multiple antenna elements and the orientation of the mobile device. The first mobile device can use the times of receipt of the response message at the different antennas in addition to sensors to detect the orientation of the device to calculate an angle of arrive to the responding device. The calculate range and angle of arrival can be stored in a memory of the mobile device. The range and/or angle of arrival can be used be one or more mobile device applications.

It should be appreciated that the specific steps illustrated in FIG. 6 provide particular techniques for many-to-many communication techniques according to various embodiments of the present disclosure. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
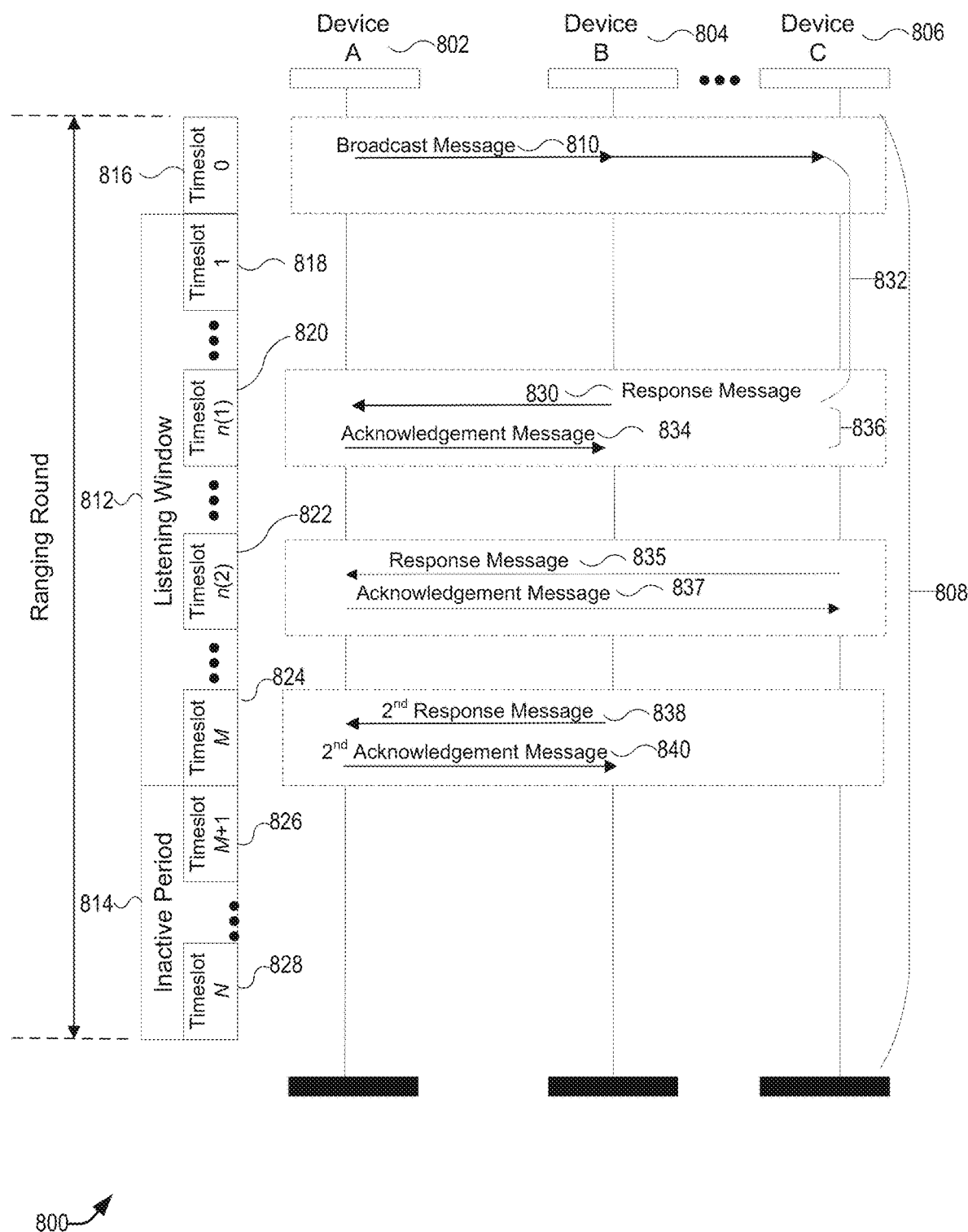
FIG. 8 illustrates an exemplary ranging exchange between an initiating mobile device and one or more computing devices.

FIG. 8 illustrates an exemplary ranging exchange 800 between a first mobile device (Device A) 802 and a plurality of computing devices (e.g., a Device B 804, and a Device C 806). Although only two devices are shown in FIG. 8, many more computer devices can participate in the ranging depending on the number of timeslots available in the listening window 812. The following techniques can be implemented to allow multiple devices to conduct ranging with an initiating device, while minimizing or avoiding collisions between messages. One of the many devices can be identified as the initiating device. The time period for conducting ranging between the initiating device and the multiple computing devices is a ranging round. The ranging round can be repeated one or more times based on requirements for an application executing on the devices. The structure for the ranging round is disclosed below.

III. Ultra-Wide Band Packet Transmissions

Ultra-Wide Band transmissions are not continuous transmissions, so a receiving device looking to acquire the UWB transmission would either need knowledge of the start time of the transmission or would need to expend energy in a powered-on state listening until the device captures the impulse UWB signal. If the receiving device knows even an approximate time of transmission, the receiver can remain in a reduced-power or sleep mode until just prior to the transmission time. For UWB communications, it can be challenging the receiving device to know when the first packet is going to arrive.

A technique to propagate the UWB transmission times is to broadcast the transmission time information at a defined time after an advertisement signal using another wireless protocol, e.g., Bluetooth Low Energy (BLE) advertisement transmissions. Although examples may refer to Bluetooth, other wireless protocols may be used. BLE has 40 physical channels in the 2.4 GHz ISM band, each separated by 2 MHz. Bluetooth defines two transmissions types: data and advertising transmissions. As such, three of these 40 channels are dedicated to advertising and 37 dedicated to data. Advertising allows devices to broadcast information defining their intentions.

The UWB information packets can be structured to transmit at a specific time relative to the transmitting device's BLE advertisements. Accordingly, the receiving device can listen for the UWB packets at an expected time or during an expected time window around the expected time. The UWB packets can convey transmitting device information, deep links, and/or transmission time information. The receiver device can use the time in the BLE advertising message to determine when to listen for the next poll. The UWB packets can be transmitted in the UWB frequency range.

The wireless protocol used for ranging can have a narrower pulse (e.g., a narrower full width at half maximum (FWHM)) than a first wireless protocol (e.g., Bluetooth) used for initial authentication or communication of ranging settings. In some implementations, the ranging wireless protocol (e.g., UWB) can provide distance accuracy of 5 cm or better. The frequency range can be between 3.1 to 10.6 Gigahertz (GHz). Multiple channels can be used, e.g., one channel at 6.5 GHz another channel at 8 GHz. Thus, in some instances, the ranging wireless protocol does not overlap with the frequency range of the first wireless protocol (e.g., 2.4 to 2.485 GHz).

The ranging wireless protocol can be specified by IEEE 802.15.4, which is a type of UWB. Each pulse in a pulse-based UWB system can occupy the entire UWB bandwidth (e.g., 500 MHz), thereby allowing the pulse to be localized in time (i.e., narrow width in time, e.g., 0.5 ns to a few nanoseconds). In terms of distance, pulses can be less than 60 cm wide for a 500 MHz-wide pulse and less than 23 cm for a 1.3 GHz-bandwidth pulse. Because the bandwidth is so wide and width in real space is so narrow, very precise time-of-flight measurements can be obtained.

Each one of ranging messages (also referred to as frames or packets) can include a sequence of pulses, which can represent information that is modulated. Each data symbol in a frame can be a sequence. The packets can have a preamble that includes header information, e.g., of a physical layer and a media access control (MAC) layer, and may include a destination address. In some implementations, a packet frame can include a synchronization part and a start frame delimiter, which can line up timing.

A packet can include how security is configured and include encrypted information, e.g., an identifier of which antenna sent the packet. The encrypted information can be used for further authentication. However, for a ranging operation, the content of the data may not need to be determined. In some embodiments, a timestamp for a pulse of a particular piece of data can be used to track a difference between transmission and reception. Content (e.g., decrypted content) can be used to match pulses so that the correct differences in times can be computed. In some implementations, the encrypted information can include an indicator that authenticates which stage the message corresponds, e.g., ranging requests can correspond to a first stage and ranging responses can correspond to a second stage. Such use of an indicator may be helpful when more than two devices are performing ranging operations in near each other.

The narrow pulses (e.g., ~two nanosecond width) can be used to accurately determine a distance. This corresponds to 500 MHz of spectrum (bandwidth). The high bandwidth (e.g., 500 MHz of spectrum) allows the narrow pulse and accurate location determination. A cross correlation of the pulses can provide a timing accuracy that is a small fraction of the width of a pulse, e.g., providing accuracy within hundreds or tens of picoseconds, which provides a sub-meter level of ranging accuracy. The pulses can represent a ranging waveform of plus 1's and minus 1's in some pattern that is recognized by a receiver. The distance measurement can use a round trip time measurement, also referred to as a time-of-flight measurement. As described above, the mobile device can send a set of timestamps, which can remove a necessity of clock synchronization between the two devices.

FIG. 7 illustrates an exemplary depiction of a timeline 700 for using the BLE advertisement signals to synchronize the timing for transmission of UWB packets. FIG. 7 illustrates a timeline 700 for transmission of multiple signals (e.g., UWB signals and BLE signals) from a single device. A transmitter device can transmit a UWB packets 702a-702j at an irregular schedule. The transmitter device can also transmit BLE advertisements 704 in a separate band to notify other devices when to listen for the next UWB packet 702a-702j transmissions. For example, the BLE advertisements 704 can be transmitted approximately every 30 milliseconds. The BLE advertisements 704 can be transmitted irregularly to avoid collisions between data packets. Thus, BLE advertisements 704 can be transmitted at a predetermined interval (e.g., every 30 seconds) plus some random delay of 0 to 10 milliseconds. This provides random dithering between advertisements. The transmitter device can transmit a UWB packet 702a-702j at a fixed time interval (ΔT) 708 following the transmission of the BLE advertisement 704. The time interval (ΔT) 708 can be predetermined so the receiving device can know to listen for the UWB packet 702a-702j after a predetermined time after transmission of the BLE advertisement 704.

In a one-to-many communication techniques, there can be multiple receiver devices, as described above. The UWB packet 702a-702j can be a ranging request 101 as shown in FIG. 1 or the broadcast message 312 as shown in FIG. 3. For example in cases with one initiating device and three receiving devices in a ranging round, individual communications can be designated in certain time slots (as shown in FIG. 8). In some embodiments, the single broadcast message for one-to-many can be the advertisement signal.

In other embodiments, for each time slot there can be a different BLE advertisement signal 704 and different UWB packets 702a-702j for that specific timeslot to synchronize the timing between the transmitting device and the receiving device in the timeslot.

In some embodiments, a mobile device can include circuitry for performing ranging measurements. Such circuitry can include one or more dedicated antennas (e.g., 3) and circuitry for processing measured signals. The ranging measurements can be performed using the time-of-flight of pulses between the two mobile devices. In some implementations, a round-trip time (RTT) is used to determine distance information, e.g., for each of the antennas. In other implementations, a single-trip time in one direction can be used. The pulses may be formed using ultra-wideband (UWB) radio technology. Ranging techniques between multiple devices can be challenging due to scheduling the transmission of ranging request messages, response messages, and acknowledgement messages on the same channel so that collisions between these messages are minimized or avoided. These techniques can be better understood with a brief explanation of ranging techniques for mobile device.

IV. Further Many-to-Many Communication Techniques

For certain applications, e.g., augmented reality, for multiple mobile devices to conduct ranging with each other. Techniques can be implements to overcome the challenges due to mobile device clock drift. If the internal clocks of the mobile devices of a group of mobile devices are not synchronized then inaccuracies in the calculation of range can result. In various embodiments clock drift (either ahead or behind true time) can affect calculated range. These techniques attempt to minimize the overlapping communications that can occur due to clock drift or other synchronization issues.

Other many-to-many ranging techniques can use predetermined ranging schedules between mobile devices. These other techniques could be inflexible and required a knowledge of how many devices were participating in a many-to-many communication session ahead of time. In addition, such other techniques can required the designation of a coordinator device of the mobile devices in the many-to-many communication session. The techniques disclosed herein simply the process for a mobile device entering or leaving a many-to-many communication ranging session.

In one embodiment, the technique includes one or more ranging rounds 808. A ranging round 808 can be temporally divided into discrete windows including an initial timeslot 816 (i.e., timeslot 0), a listening window 812, and an inactive period 814. Prior to the ranging round 808 starting, the initiating mobile device 802 can determine the parameters for the ranging round 808 including the initial timeslot 816, the number of response timeslots, and the duration of each response timeslot. The parameters of the ranging round 808 can be based in part on the number of computing devices in the ranging round 808 and any information concerning known distances between the devices 804, 806. The parameters of the ranging round 808 can be generated by the one or more processors of the initiating mobile device 802 and stored in a memory of the initiating mobile device 802. The parameters of the ranging round 808 can be incorporated into a broadcast message 810 for transmission to the other mobile devices 804, 806. The parameters of the ranging round 808 can also be defined by a certain protocol used for the ranging.

The number and duration of slots for the ranging round 808 can dynamically change. For example, if the number of collisions detected increases, the number of slots can be increased for the ranging round 808. This will allow more slots for the ranging round 808 providing increased opportunities for second response messages 838 in the case of collisions during an earlier timeslot. If the number of detected collisions decreases, the number of available slots can be decreased to reduce power requirements for ranging.

The broadcast message 810 can be transmitted by the initiating mobile device 802 during the initial timeslot 816. In some embodiments, the time and duration of the initial timeslot 816 can be included in the broadcast message 810. In this way, devices 804, 806 receiving the broadcast message 810 will know not to conduct ranging during the initial timeslot 816.

The broadcast message 810 can also include an identifier of the initiating mobile device 802. The identifier of the initiating mobile device 802 can be received by mobile devices 804, 806 and subsequently included in the response message 830 so the initiating mobile device 802 can identify that the response message 830 is associated with the broadcast message 810 transmitted by the initiating mobile device 802. In some embodiments, the identifier can be provided by the manufacturer of the electronic device (e.g., International Mobile Equipment (IMEI) number). In some embodiments, the identifier can be a portion of an IMEI number (e.g., only last five digits).

The duration of each of the timeslots can also be specified in the broadcast message 810. By specifying a number and duration of each of the timeslots, the mobile devices 804, 806 can select from a number of different defined time periods to conduct ranging to reduce the potential for missed messages from collisions between messages on the same channel. The failure for a mobile device 804, 806 to receive an acknowledgment message 834 from the initiating mobile device 802 in response to the response message 830 can be an indication of two devices transmitting in the same timeslot. Instead of just re-transmitting the response message 830 again during the same timeslot, a different timeslot that is later in time during the listening window 812 can be selected by the device to conduct ranging. In this way, the potential collisions by multiple devices 804, 806 conducting ranging operations during the same timeslot can be reduced.

The initiating mobile device 802 can transmit the broadcast message 810 to initiate the process at Timeslot zero 816. The listening window 812 and corresponding timeslots can begin immediately after the broadcast transmission is complete.

The parameters for a ranging round 808 can be communicated from the initiating mobile device 802 to the plurality of computing devices via the broadcast message 810. For example, FIG. 8 shows timeslot-1 818 through Timeslot-M 822 in the listening window 812. M can be an integer greater than 2. The number of timeslots can be related to the number of devices participating in the ranging session. As the number of devices participating increases, the number of timeslots should also increase.

Following the initial timeslot 816, a listening window 812 begins. The listener window 812 can be divided into multiple, non-overlapping timeslots (e.g., Timeslot-1 818 to Timeslot-M 824) to provide designated times for the computing devices to conduct ranging with the initiating device 802. The timeslots offer a designated window of time for a device 804, 806 to conduct ranging with the initiating mobile device 802. A device 804, 806 can receive the ranging round parameters such as the number and duration of the timeslots from the initiating device 802.

From these parameters, each of the devices 804, 806 can independently select a timeslot to conduct ranging with the initiating mobile device 802. Under some circumstances, more than one device 804, 806 can select the same timeslot resulting in undesirable missed messages due to collisions. Therefore, the devices 804, 806 can select the timeslot to conduct ranging randomly or pseudo-randomly to reduce the potential for collisions. The timeslots can be temporally based on a time period from the initiating mobile device's transmission of the broadcast message 810. In some embodiments, the listening window 812 can include 20 to 40 timeslots. The duration of the timeslots can be in the order of milliseconds (ms).

The timeslots provide an opportunity for the devices 804, 806 to conduct a ranging session with the initiating mobile device 802. Upon receiving the broadcast message 810, the one or more processors of devices 804, 806 execute a routine to select a timeslot of the multiple timeslots defined in the broadcast message 810. The selected timeslots can be stored in the memory of the devices 804, 806. The selection of the timeslot is discussed below.

During the selected timeslot, a device 804, 806 transmits a response message 830 to the initiating mobile device 802. The response message 830 can include information the initiating mobile device 802 needs to identify the device 804, 806. In addition, the response message can include information to link the response message 830 to the initiating mobile device 802 such as the identifier of the initiating mobile device 802. The response message 830 can also include an estimate distance between the initiating mobile device 802 and the device 804, 806 that can be calculated by one or more processors of the device 804, 806.

During the selected timeslot, upon receiving the response message 830, the one or more processors of initiating mobile device 802 can calculate a first distance between the initiating mobile device 802 and the device 804, 806. The first distance can be calculated by recognizing the timeslot that the device 802, 804 is responding. The initiating mobile device 802 knows when the timeslot begins and can calculate a time duration from beginning of the timeslot until reception of the response message 830. The time duration is related to the first distance between the initiating mobile device 802 and device 804, 806. The first distance can be calculated be calculated by multiplying the time duration by the speed of light (c). In some embodiments, a processing time by the initiating mobile device 802 can be subtracted from the time duration to account for any delays in receiving and processing the response message 830.

During the selected timeslot, the initiating mobile device 802 can transmit an acknowledgement message 834 to the device 804, 806. The acknowledgement message 834 informs the device 804, 806 that the response message 830 has been received by the initiating mobile device 802. In some embodiments the acknowledgement message 834 can include information such as an identifier of the initiating mobile device 802, an identifier of the device 804, 806, a first distance between the initiating mobile device 802 and a device 804, 806, and a delay time.

Under some circumstances, collisions between messages transmitted on the same channel can result in an initiating mobile device 802 not receiving a response message 830 or a device 804, 806 not receiving an acknowledgment message 834. The devices 804, 806 can determine that it has not received the acknowledgement message in response to the response message 830 it transmitted. In these circumstances, the device 804 can select a second timeslot to transmit the second response message 838. The timeslot 824 for the second response message 838 can be selected randomly or pseudo-randomly. In response to receiving the second response message 838, the initiating mobile device 802 can transmit a second acknowledgement message 840 to the device 804. The second acknowledgement message 840 informs the device 804, 806 that the second response message 638 has been received by the initiating mobile device 802. In some embodiments the second acknowledgement message 840 can include information such as an identifier of the initiating mobile device 802, an identifier of the device 804, 806, a first distance between the initiating mobile device 802 and a device 804, 806, and a delay time. Under some circumstances, the second acknowledgement message may not be received due to collisions between the messages. In this case, a third timeslot can be selected for ranging between the devices. This process can continue until all devices 804, 806 have received an acknowledgement message from the initiating mobile device 802.

Following the listening window 812, the ranging round 808 includes and inactive period 814. The inactive period 814 provides a time delay between ranging rounds 808 in order to preserve power on the initiating device 802 and the responding devices 804, 806. If there was no inactive delay, the ranging rounds can occur too frequently resulting in increased power consumption of the devices. The inactive period can also be divided into multiple timeslots e.g., Timeslot-M+1 826 and Timeslot-N 828. In various embodiments, there can be only one timeslot in the inactive period 814.

A. Slot Selection

In computer networking, multicast is group communication where data transmission is addressed to a group of destination computers simultaneously. Multicast can be one-to-many or many-to-many distribution. In multicast techniques, the timeslots will be allocated. In contrast, in broadcast scenarios the timeslots will not be assigned. In broadcast situations, the initiating mobile device 802 does not know how many responding devices (e.g., device 804 and device 806) there are or what the identifications of the responding devices will be.

The devices 804, 806 can receive the broadcast message 810 transmission. Upon receipt and processing of the broadcast message 810, the mobile device 804, 806 can select one of the timeslots (e.g., 818-824) listed in the broadcast message 810 for sending the response message 830 to conduct ranging between the devices. The devices 804, 806 are not be assigned to a particular timeslot 818, 820, 822, 824. Instead, the devices 804, 806 can select one of the timeslots 818, 820, 822, 824 for transmission of a response message 830. The selection can be made randomly or pseudo-randomly. The random or pseudo random selection reduces the amount of missed messages due to collision of messages on the channel.

As depicted, device 804 selects timeslot 820. Device 804 receives the broadcast message 810 during Timeslot-0 816 then waits until the start of timeslot-n(1) 820. Ranging with other devices could occur in the interim during timeslot-1 818. During the selected timeslot 820, device 804 transmits a response message 830. The response message 830 can include an identifier (e.g., International Mobile Equipment (IMEI) number) of device 804.

The time period between the reception of the broadcast message 810 at the device 804 and the time of the transmission of the response message 830 can be known as the Reply Time (D1) 832. The Reply Time (D1) 832 can include the processing time at the device 804 to receive and process the contents of the broadcast message 810, generate the response message 830, and transmit the response message 830. The Reply Time (D1) 832 also includes the waiting time until the selected timeslot begins. The Reply Time (D1) 832 can also be referred to as the received (RX) to transmission (TX) time.

During the selected timeslot, the initiating mobile device 802 can receive the response message 830. The initiating mobile device 802 can calculate a round-trip time (R1) as the time difference between a broadcast message 810 transmission time (at timeslot zero) and a response message 830 reception time. In response to receiving the response message 830, the initiating mobile device 802 can generate an acknowledgement message 834. The initiating mobile device 802 can also calculate a reply time 836 (D2) between receiving response message 830 and transmitting an acknowledgement message 834. The initiating mobile device 802 can calculate a first distance between the initiating mobile device 802 and the device 804 by multiplying the round-trip time (R1) by the speed of light (c).

The acknowledgement message 834 can include information such as: an identifier of the initiating mobile device 802, an identifier of the device 804, the round trip time R1, a first distance, and the reply time 836. The initiating mobile device 802 can use the round-trip time (R1) and Reply Time (D2) 832 to calculate a coarse range estimate between the initiating mobile device 802 and device A 804. By responding within a designated time period, the initiating mobile device 802 can determine what timeslot (818, 820, 822, 824) was selected by the responding device. The Reply Time (D2) 836 should be shorter than Reply Time (D1) 832 because there is no specific waiting period by the initiating mobile device 802 to transmit the acknowledgment message 834. The Reply Time (D2) 836 only includes the time that the initiating mobile device 802 receives and processes the response message 830 and the time the initiating mobile device 802 takes to generate and transmit the acknowledgement message 834.

Similarly, device 806 can receive the broadcast message 810 in timeslot-0 816. Device B 806 can respond by sending a response message 830 in Timeslot-n(2) 822. The initiating mobile device 802 can receive the response message 835 from device 806 and generate and transmit the acknowledgement message within timeslot-n(2) 822. The information contained in the response message 835 can be similar to the types of information response message 830 as described above. The information contained in the acknowledgement message 837 can be similar to the types of information contained in the acknowledgement message 834 as described above. Other timeslots of the M total number of timeslots can be also used for In the event that a device 804 or device 806 fails to receive an acknowledgement message 834 or acknowledgement message 837, a presumption can be that there has been a collision between the transmitted messages. When a packet collision occurs, the packets are either discarded or sent back to their originating stations and then retransmitted in a timed sequence to avoid further collision. Packet collisions can result in the loss of packet integrity or can impede the performance of a network. Packet collisions can result in the initiating mobile device 802 or devices 804, 806 failing to calculate a range. The devices conduct ranging on a single channel that can use a single discrete frequency. If the initiating mobile device 802 or devices 804, 806 are communicating on the same channel at the same time, the interference between the other devices and result in undesirable data collisions during the exchange. If either of devices 804, 806 does not receive an acknowledgement message 834 or acknowledgement message 837, the device 804, 806 can be programmed to transmit a second response message 838. If sufficient time remains within the selected timeslot, the second response message can be transmitted within the originally selected timeslot. In some embodiments, the device 804, 806 can select a different timeslot (e.g., timeslot-M 824) to transmit the second response message 835. In this case, the initiating mobile device 802 can transmit a second acknowledgement message 840. The second acknowledgement message 838 can include the same types of information described above for the first acknowledgement message 834. In the case of further collisions, this process can be repeated until the second acknowledgement message 840 is received by the device.

B. Range Calculation

Figure 9:
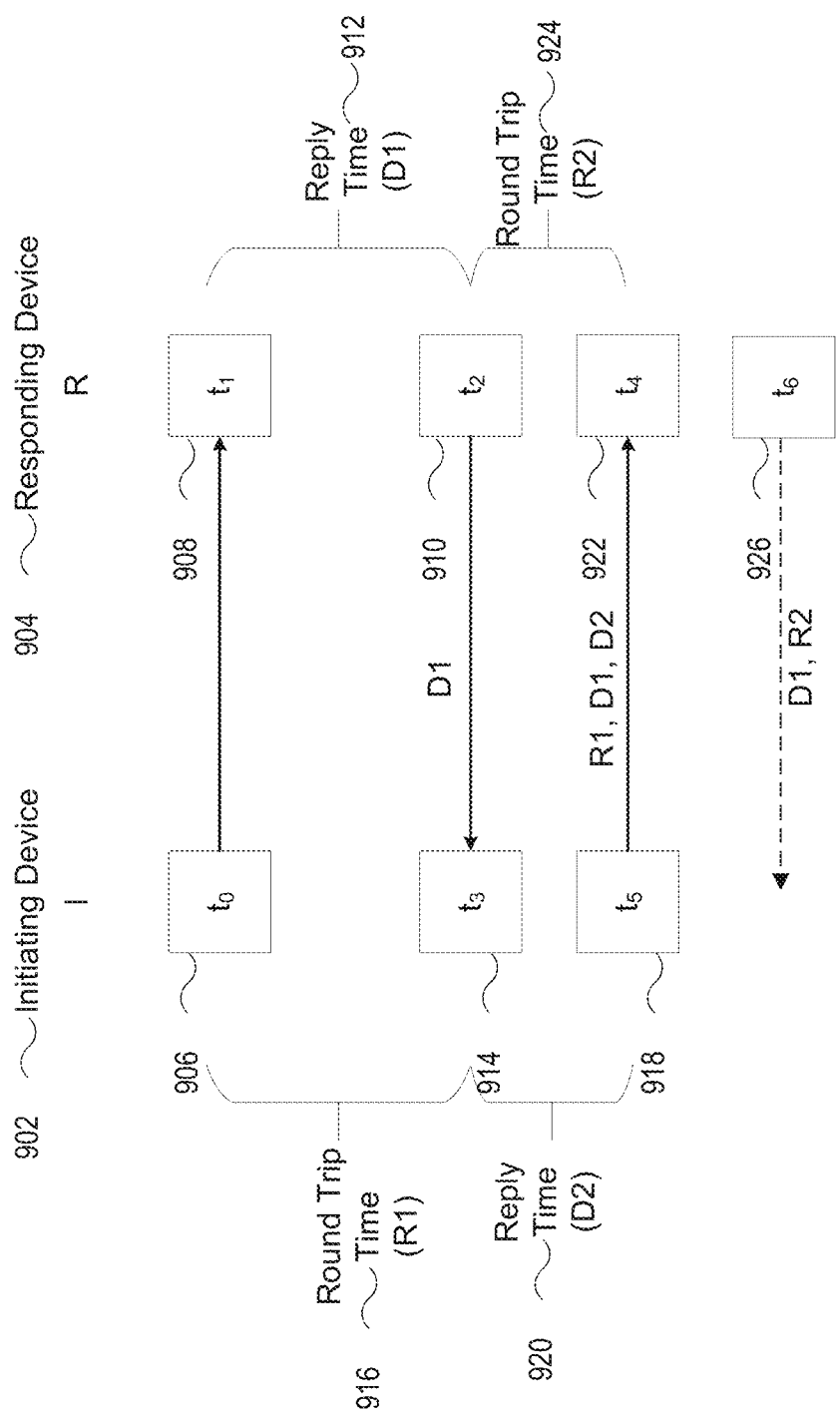
FIG. 9 illustrates a simplified timeline for a ranging round between a transmitting device and a receiving device.

FIG. 9 illustrates a simplified timeline 900 for ranging exchange between an initiating device 902 and a computing device 904. At time to 906 the initiating device 902 can transmit a broadcast message. The broadcast message can be received by a computing device 904 at time $t_1$ 908. At some time later at $t_2$ 910, the device 904 can transmit a response message to the initiating device 902. The Reply Time (D1) 912 can be the elapsed time between $t_1$ 908 and $t_2$ 910. The Reply Time (D1) 912 can include any delay in processing the broadcast message, and generating and transmitting the response message. The Reply Time (D1) 912 can also include the delay waiting for the selected timeslot to begin.

The response message can be received by the initiating device 902 at time $t_3$ 914. The Round Trip Time (R1) 916 can be calculated as the elapsed time between the $t_0$ 906 and $t_3$ 914. In some embodiments, the device 904 can transmit include the reply time (D1) 912 as part of the information contained in the data packet sent to the initiating device 902. The initiating device 902 can calculate a time of flight (TOF) by subtracting the Reply Time (D1) 912 from the Round Trip Time (R1) 916. The initiating device 902 can calculate a coarse range between the initiating device 902 and the device 904 can be calculated by multiplying the TOF by the speed of light (c) or a fixed speed of 299, 794, 458 meters per second.

Upon receiving the response message, the initiating device 902 generates and transmits an acknowledgement message at time $t_5$ 918. The Reply Time (D2) can include the elapsed time between $t_5$ 918 and $t_3$ 914. The Reply Time (D2) can include the processing time to receive the response message, generate, and transmits the acknowledgement message. In some embodiments, the acknowledgement message can include the information such as the round trip time (R1) 916 and the Reply Time (D2) 920.

The acknowledgement message can be received by the device 904 at time $t_4$ 922. The device 904 can receive the acknowledgement message. In some embodiments, the device 904 can receive the acknowledgement message containing the round trip time (R1) 916, the reply time (D1) 912, and reply time (D2) 920 to calculate a precise range between the initiating device 902 and the device 904. The device 904 can calculate a time of flight (TOF) or a time difference by subtracting the reply time (D2) 920, from the round trip time (R2) 924. As computing signals travel at the speed of light (c), a precise range between the device 904 and the initiating device 902 can be determined by multiplying the speed of light by the TOF.

In some embodiments, the device 904 can transmit a ranging message at time $t_6$ 926 from the device 904. The ranging message can include the round trip time (R2) 924 and the Reply Time (D1) 912. The initiating device 902 can receive the ranging message to calculate a precise range between the initiating device 902 and the device 904.

The Acknowledgement message(s) received by the device 904 can be checked to determine an identifier of the device that transmitted the response message. The device 904 will ignore acknowledgement messages with different identifiers.

In some embodiments, a third transmission can be sent from the device 904 to the initiating device 902. In some embodiments, the third transmission can include the time of flight (TOF) calculation.

Each of the devices of the plurality of devices can similarly determine the range of the device 904 from the initiating device 902. The multiple devices do not communicate their selected timeslots with each other. As a result, one or more devices may select the same time slot. As the devices transmit the information packets on the same frequency, collisions can occur between the data packages resulting in lost data. The greater the number of participating devices, the greater the likelihood that the devices will select the same timeslot, possibility resulting in an increased number of collisions between the data packages. Conversely, the few the number of participating devices, the lower the likelihood there will be collisions and lost data.

In some embodiments, the number of timeslots within the ranging round can vary. The number of timeslots can increase based on the number of collisions. As previously described, the number of computing devices in the vicinity of the initiating mobile device can affect the number of collisions. As more collisions are detected, the number of slots can be increased to accommodate the number of devices. As fewer collisions are detected, the number of slots can be decreased to reduce power requirements for the initiating mobile device.

C. Sequence Diagrams for Schedules

Figure 10:
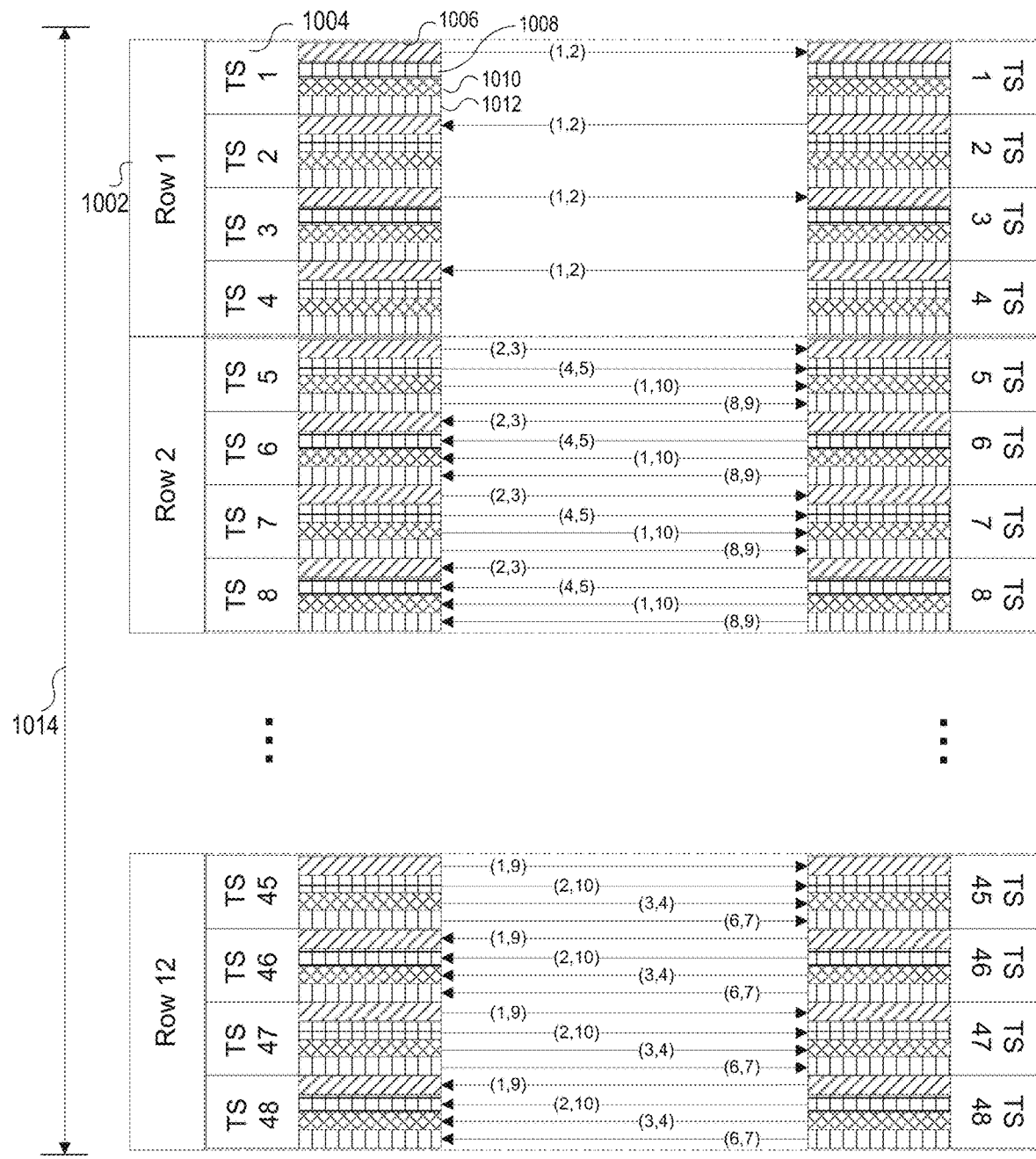
FIG. 10 illustrates an exemplary sequence diagram for a ranging session between mobile devices.

FIG. 10 illustrates a portion of an exemplary sequence diagram 1000. In the exemplary sequence diagram 1000, the maximum number of devices (K) is ten (10) and the number of channels is (N) is four (4). In the exemplary sequence diagram 1000, the 4-packet exchanges can provide precise range information at both initiator and responder devices. For example, for the first timeslot 1004, Device 1 is the initiator of the ranging exchange and Device 2 is the responder device. The exemplary sequence diagram 1000 can have a total of twelve (12) rows 1002. The exemplary sequence diagram 1000 can have a total of 48 time slots, each time slot approximately 2.5 milliseconds each in duration. During each time slot up to four packets of ranging operations (1006, 1008, 1010, and 1012) can occur. The entire ranging sequence 1014 can last 120 milliseconds, resulting in a measurement rate of 8.3 Hz.

As depicted in FIG. 10, Device 2 is responding device in the Device 1 to Device 2 exchange (1,2) but later in pair (2,3) exchange, Device 2 becomes the initiator device. Device 2 can propagate timing information from Device 1. It transmits its poll packet in the (2,3) exchange by forward projecting the time at which it received Device 1's poll packet in the (1,2) exchange. Each device, except Device 1, when acting as initiator in pair (x, J) must send its poll packet at a time that is a forward projection of when it last received a poll packet in pair (l,x), with device 1 being the most recent device to which it ranged as a responder device. Device 1 (coordinator) is always initiator for this configuration and therefore establishes the timing for all pairwise exchanges in the ranging schedule.

D. Many-to-Many Ranging Techniques

Figure 11:
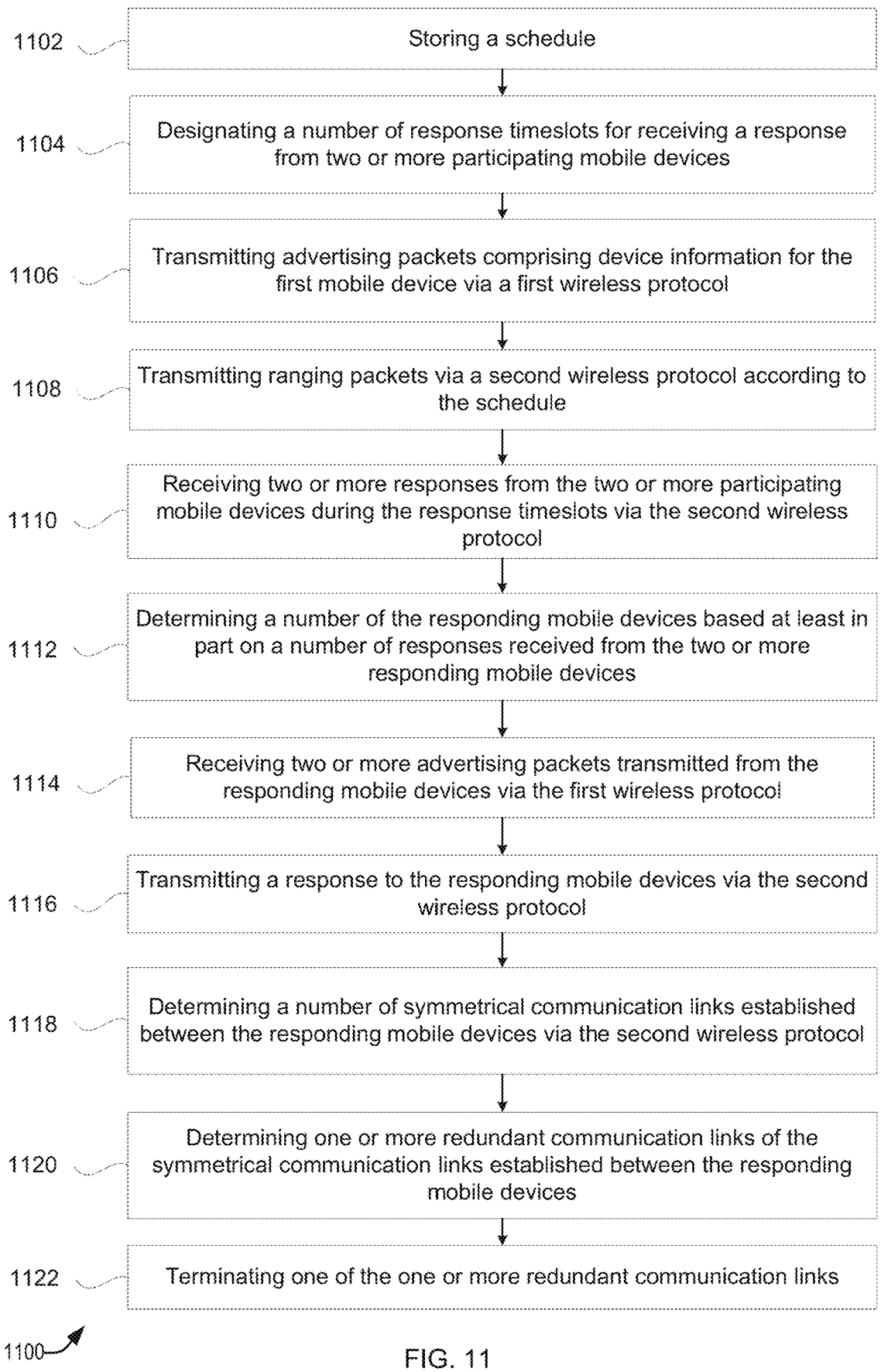
FIG. 11 illustrates an exemplary flowchart for many-to-many communication techniques.

FIG. 11 illustrates an exemplary flowchart for a ranging technique performed by on e or more mobile devices. Method 1100 can be used to can be used to determine a spatial relationship of three or more mobile devices to each of the other mobile devices. One or more instructions to perform the aforementioned operations can be stored in a non-transitory computer-readable medium that can be executed by one or more processors.

At 1102, the technique can include storing a schedule. The schedule can specify a transmission time for transmitting ranging packets. The schedule can be stored in a memory of the one or more mobile devices. The schedule can include a plurality of time delays from a timing signal to define multiple response timeslots.

In various embodiments the schedule can define a ranging round that can include an initial timeslot and a plurality of response slots for discovering and performing ranging with any mobile device in a vicinity of the initiating device.

At 1104, the technique can include designating a number of response timeslots for receiving a response from two or more participating mobile devices during the number of response timeslots. Each of the response slots is non-overlapping in time with other of the plurality of response slots. The initiating device can determine a number of response slots, a total ranging time, a duration of each of the timeslots, a number of timeslots for an inactive period, and a total time for the inactive period. In some embodiments, the defining the ranging round includes modifying the response slots.

At 1106, the technique can include transmitting advertising packets comprising device information for the first mobile device via a first wireless protocol at an interval. The interval can be random or pseudo-random. In various embodiments the first wireless protocol can be a low power wireless protocol (e.g., advertising signal of Bluetooth Low Energy). The transmission of the advertising packets can be a request to establish pairwise ranging sessions can be received by one of more mobile devices within range of the first wireless protocol signal. The transmission schedule for the advertising packets can be transmitted randomly or pseudo randomly. The one or more receiving devices can receive the advertising packets. The advertising packets can include information concerning the identity of the transmission device. In some embodiments, the advertising packets can include the schedule for transmission of ranging packets. The one or more receiving device can use the advertising packets as a timing signal to calculate a transmission time for ranging packets.

At 1108, the technique can include transmitting ranging packets via a second wireless protocol according to the schedule. The ranging packets can correspond to the ranging messages 602a-j as shown in FIG. 6. The ranging packets can be transmitted in any number of the response slots and is not limited to slot 1. The ranging request can use the ultra-wide band protocol (UWB). The ranging request can be associated with a ranging round having a plurality of response slots. Each of the plurality of response slots is non-overlapping in time with other of the plurality of response slots. The response slots can be set at predetermined time intervals after transmission of the request to establish the outgoing pairwise ranging sessions. The ranging request can be associated with an initiating device identifier of the initiating device. In this way, the devices can limit the responses to ranging requests only originating from the initiating device. The ranging request can include information on a number of available slots. In some embodiments, ranging request can include information on the length or duration of the timeslots for a ranging round. The initiating device can be a computing device (e.g., a smartphone).

The ranging packets can include a schedule for responding for one or more mobile devices. The schedule can include one or more time delays following the receipt of the ranging message. The responding device can randomly select one of the response timeslots to respond to the mobile device. The response message can include a time of receipt of the ranging message. The response message can include an identifier for the responding message. The response message can include a rough range calculation between the first mobile device and the second mobile device. The responding mobile device can use a time in the ranging message to calculate a rough range between the initiating and responding mobile device.

In various embodiments the request can include information concerning the transmitting mobile device (e.g., device identifier). The request can include a time delay (Δt) following the reception of the request to begin a pairwise ranging session. This allows the receiving mobile devices to determine a listening window to receive a ranging message from the initiating mobile device. The pairwise ranging sessions can occur using a second wireless protocol. The second wireless protocol can be ultra-wideband transmissions.

At 1110, the technique can include receiving two or more responses from the two or more participating mobile devices during the response timeslots via the second wireless protocol. The two or more responses can include information from the two or more participating mobile devices from responding mobile devices. In various embodiments the second wireless protocol is ultra wideband protocol. In various embodiments, each response of the two or more responses includes an identifier of each of the responding mobile devices. The first response slot can include the timeslot-n(1) 820 as shown in FIG. 8. The first response message can correspond to the response message 830 as shown in FIG. 8. The first response message can be packet information including an identifier of the first device that transmitted the response message. The identifier can be an IMEI number. The first response message can also include Reply Time (D1) or the elapsed time from receipt of the broadcast message until transmission of the first response message. The Reply Time (D1) can include any delay waiting for the start of the selected timeslot. The Reply Time (D1) can also include any processing time for receiving and processing the broadcast message and processing and transmitting the first response message. The first response message can also include a rough estimate of the distance to the initiating mobile device as calculated by one or more processors of the device. The first response message can also include an identifier of the initiating device.

At 1112, the technique can include determining a number of the responding mobile devices based at least in part on a number of responses received from the two or more responding mobile devices. The two or more responding devices can be configured to perform similar communication steps as the first mobile device. The number of responding devices can be stored in a memory. In various embodiments, an identifier for each of the responding mobile devices can be stored in a memory.

At 1114, the technique can include receiving two or more advertising packets transmitted from the responding mobile devices via the first wireless protocol. The two or more advertising packets can include information regarding the initiating device. The two or more advertising packets can include a schedule for ranging sessions. The responding mobile devices can use the advertising packets to determine one or more responding timeslots.

At 1116, the technique can include transmitting a response to the responding mobile devices via the second wireless protocol. The second wireless protocol can be ultra wideband wireless protocol. The response message can include an identifier of the responding device. In various embodiments the response message can include an identifier of the initiating device. The range between the initiating mobile device and the responding mobile device can be determined by calculated the round trip time between the transmission of the ranging message and the receipt of an acknowledgement message, subtracting any processing delays. In some embodiments, a ranging operation may have more than one exchange of messages between the initiating mobile device and the responding mobile device. Multiple message exchanges allows for range determination, even if one of the messages is missed.

At 1118, the technique can include determining a number of symmetrical communication links established between the responding mobile devices via the second wireless protocol. The symmetrical communication link can be between the first mobile device and one of the responding mobile devices.

Each ranging session can include multiple pairwise message exchanges between the devices. For each ranging session one mobile device is the initiating device. The initiating device transmits the ranging message. The second mobile device in the ranging session is the responding device. The responding mobile device receives the ranging message and transmits a response message. The response message can include an identifier of the responding device. In some embodiments, the response message can include the time of the response. The initiating mobile device can receive the response message and calculate a range between the devices. In various embodiments, multiple pairwise message exchanges can occur during a ranging session.

In various embodiments, a first mobile device can act as both the initiating device and a responding device in a pairwise message exchange with a second mobile device. These ranging sessions can be considered symmetrical links. As the first pairwise message exchange can be adequate for determining a range between the first device and the second device, one of the two ranging sessions can be considered redundant. Redundant links are inefficient because it results in additional power required from each of the devices and the additional ranging messages can increase the number of data packet collisions in the same frequency bandwidth.

At 1120, the technique can include determining one or more redundant communication links of the symmetrical communication links established between the responding mobile devices. A redundant communication link comprises a second symmetrical communication link between the first mobile device and the one of the responding mobile devices.

In some embodiments, the technique can maintain the inefficiency of redundant links. In various embodiments, one mobile device can communicate to the other mobile device using an in-band or out of band protocol to communicate loading to reduce one or more redundant ranging sessions. In various embodiments, signal strength can be used to determine which of the redundant ranging sessions to prune. The devices can randomly select which of the redundant ranging sessions to prune. The characteristics of the mobile devices (e.g., a Media Access Control (MAC) address) can be used to determine which ranging session to prune. In various embodiment, the common criteria can include an identifier (e.g., IMEI) for a mobile device. The common criteria can include a portion of the identifier for the mobile device.

At 1122, the technique can include terminating one of the one or more redundant communication links established between the first mobile device and one of the responding mobile devices in coordination the one of the responding mobile devices. The terminating can include providing instructions to the initiating mobile device to cease transmission of the ranging packets.

It should be appreciated that the specific steps illustrated in FIG. 11 provide particular techniques for many-to-many communication techniques according to various embodiments of the present disclosure. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

V. Mobile Device for Performing Communications

Figure 12:
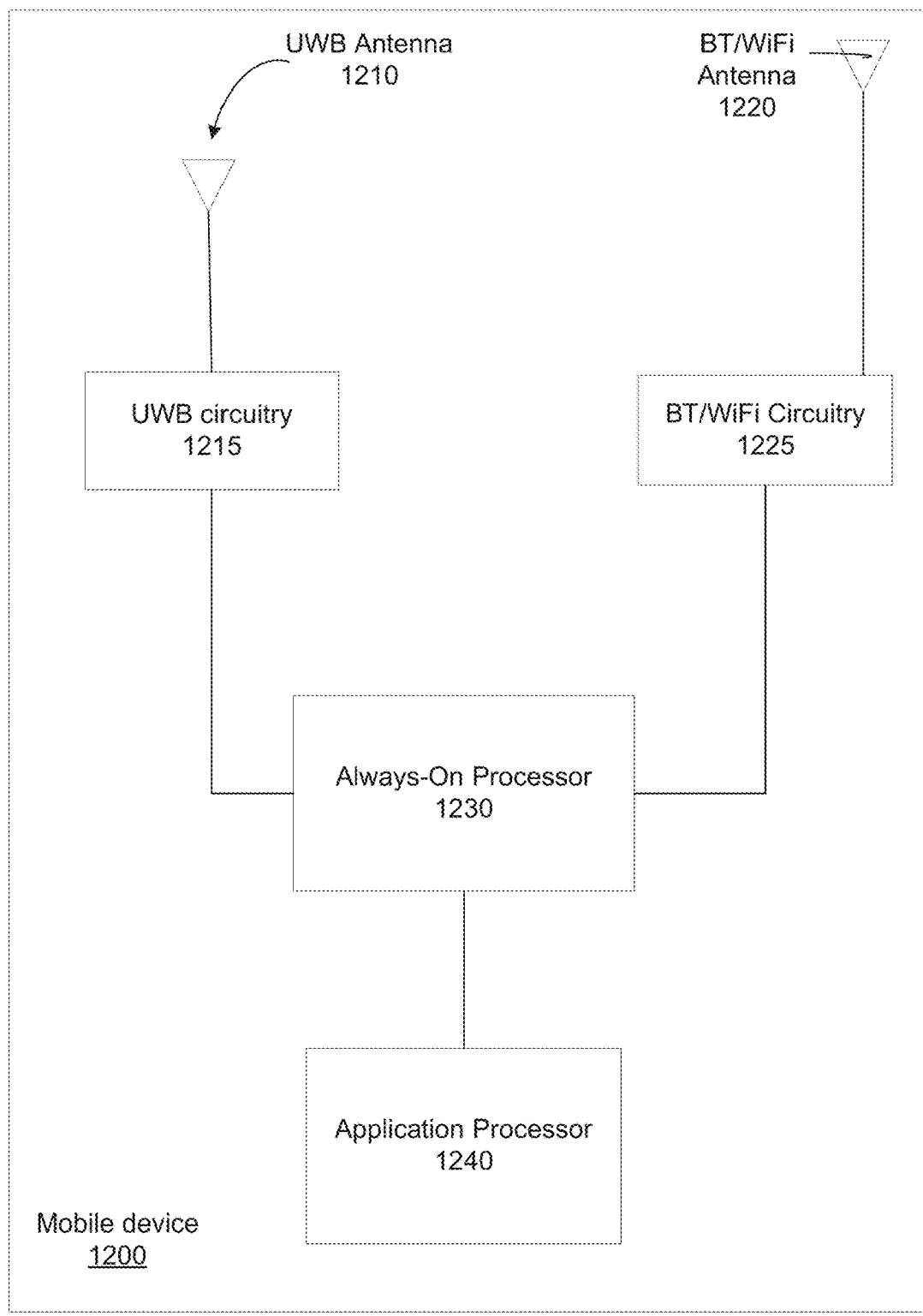
FIG. 12 is a block diagram of components of a mobile device operable to perform ranging according to embodiments of the present disclosure.

FIG. 12 is a block diagram of components of a mobile device 1200 operable to perform ranging according to embodiments of the present disclosure. Mobile device 1200 includes antennas for at least two different wireless protocols, as described above. The first wireless protocol (e.g., Bluetooth) may be used for authentication and exchanging ranging settings. The second wireless protocol (e.g., UWB) may be used for performing ranging with another mobile device.

As shown, mobile device 1200 includes UWB antennas 1210 for performing ranging. UWB antennas 1210 are connected to UWB circuitry 1215 for analyzing detected signals from UWB antennas 1210. In some embodiments, mobile device 1200 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

UWB circuitry 1215 can communicate with an always-on processor (AOP) 1230, which can perform further processing using information from UWB messages. For example, AOP 1230 can perform the ranging calculations using timing data provided by UWB circuitry 1215. AOP 1230 and other circuits of the device can include dedicated circuitry and/or configurable circuitry, e.g., via firmware or other software.

As shown, mobile device 1200 also includes Bluetooth (BT)/Wi-Fi antenna 1220 for communicating data with other devices. Bluetooth (BT)/Wi-Fi antenna 1220 is connected to BT/Wi-Fi circuitry 1225 for analyzing detected signals from BT/Wi-Fi antenna 1220. For example, BT/Wi-Fi circuitry 1225 can parse messages to obtain data (e.g., an authentication tag), which can be sent on to AOP 1230. In some embodiments, AOP 1230 can perform authentication using an authentication tag. Thus, AOP 1230 can store or retrieve a list of authentication tags for which to compare a received tag against, as part of an authentication process. In some implementations, such functionality could be achieved by BT/Wi-Fi circuitry 1225.

In other embodiments, UWB circuitry 1215 and BT/Wi-Fi circuitry 1225 can alternatively or in addition be connected to application processor 1240, which can perform similar functionality as AOP 1230. Application processor 1240 typically requires more power than AOP 1230, and thus power can be saved by AOP 1230 handling certain functionality, so that application processor 1240 can remain in a sleep state, e.g., an off state. As an example, application processor 1240 can be used for communicating audio or video using BT/Wi-Fi, while AOP 1230 can coordinate transmission of such content and communication between UWB circuitry 1215 and BT/Wi-Fi circuitry 1225. For instance, AOP 1230 can coordinate timing of UWB messages relative to BT advertisements.

Coordination by AOP 1230 can have various benefits. For example, a first user of a sending device may want share content with another user, and thus ranging may be desired with a receiving device of this other user. However, if many people are in the same room, the sending device may need to distinguish a particular device among the multiple devices in the room, and potentially determine which device the sending device is pointing to. Such functionality can be provided by AOP 1230. In addition, it is not desirable to wake up the application processor of every other device in the room, and thus the AOPs of the other devices can perform some processing of the messages and determine that the destination address is for a different device.

To perform ranging, BT/Wi-Fi circuitry 1225 can analyze an advertisement signal from another device to determine that the other device wants to perform ranging, e.g., as part of a process for sharing content. BT/Wi-Fi circuitry 1225 can communicate this notification to AOP 1230, which can schedule UWB circuitry 1215 to be ready to detect UWB messages from the other device.

For the device initiating ranging, its AOP can perform the ranging calculations. Further, the AOP can monitor changes in distance between the other devices. For example, AOP 1230 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

VI. Example Device

Figure 13:
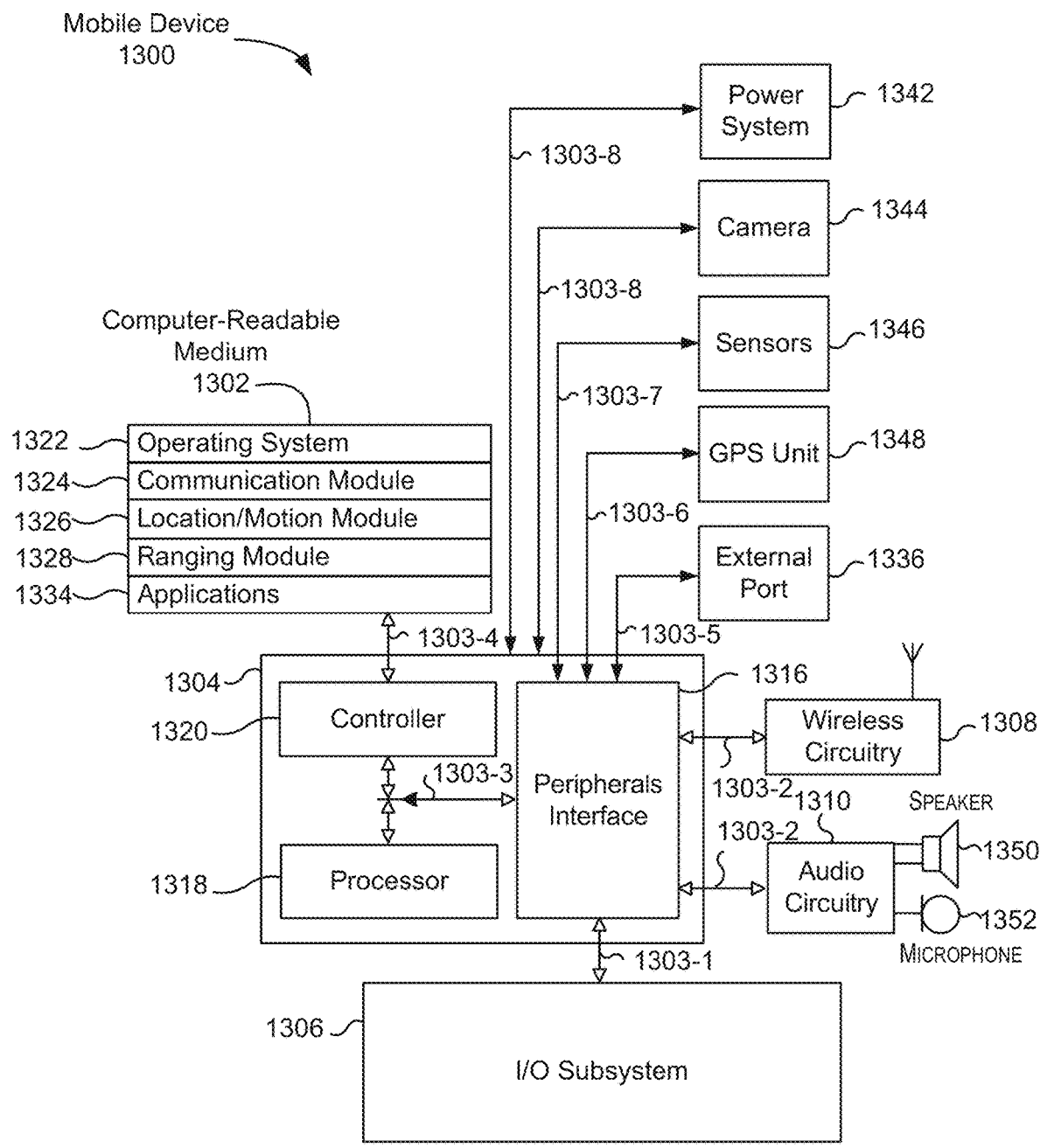
FIG. 13 is block diagram of an example device according to embodiments of the present disclosure.

FIG. 13 is a block diagram of an example electronic device 1300. Device 1300 generally includes computer-readable medium 1302, a processing system 1304, an Input/Output (I/O) subsystem 1306, wireless circuitry 1308, and audio circuitry 1310 including speaker 1350 and microphone 1352. These components may be coupled by one or more communication buses or signal lines 1303. Device 1300 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 13 is only one example of an architecture for device 1300, and that device 1300 can have more or fewer components than shown, or a different configuration of components. The various components shown in FIG. 13 can be implemented in hardware, software, or a combination of both hardware and software, including one or more signal processing and/or application specific integrated circuits.

Wireless circuitry 1308 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 1308 can use various protocols, e.g., as described herein. In various embodiments, wireless circuitry 1308 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1308 is coupled to processing system 1304 via peripherals interface 1316. Peripherals interface 1316 can include conventional components for establishing and maintaining communication between peripherals and processing system 1304. Voice and data information received by wireless circuitry 1308 (e.g., in speech recognition or voice command applications) is sent to one or more processors 1318 via peripherals interface 1316. One or more processors 1318 are configurable to process various data formats for one or more application programs 1334 stored on medium 1302.

Peripherals interface 1316 couple the input and output peripherals of device 1300 to the one or more processors 1318 and computer-readable medium 1302. One or more processors 1318 communicate with computer-readable medium 1302 via a controller 1320. Computer-readable medium 1302 can be any device or medium that can store code and/or data for use by one or more processors 1318. Computer-readable medium 1302 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read only Memory (ROM), FLASH, magnetic and/or optical storage devices, such as disk drives, magnetic tape, CDs (compact disks) and DVDs (digital video discs).

In some embodiments, peripherals interface 1316, one or more processors 1318, and controller 1320 can be implemented on a single chip, such as processing system 1304. In some other embodiments, they can be implemented on separate chips.

Processor(s) 1318 can include hardware and/or software elements that perform one or more processing functions, such as mathematical operations, logical operations, data manipulation operations, data transfer operations, controlling the reception of user input, controlling output of information to users, or the like. Processor(s) 1318 can be embodied as one or more hardware processors, microprocessors, microcontrollers; field programmable gate arrays (FPGAs), application-specified integrated circuits (ASICs), or the like.

Device 1300 also includes a power system 1342 for powering the various hardware components. Power system 1342 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1300 includes a camera 1344. In some embodiments, device 1300 includes sensors 1346. Sensors can include accelerometers, compass, gyrometer, pressure sensors, audio sensors, light sensors, barometers, and the like. Sensors 1346 can be used to sense location aspects, such as auditory or light signatures of a location.

In some embodiments, device 1300 can include a GPS receiver, sometimes referred to as a GPS unit 1348. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

An initiating mobile device can transmit a timing signal via a wireless protocol (e.g., Bluetooth Low Energy (BLE) advertising). One of the advantages of BLE is lower power consumption even when compared to other low power technologies. BLE achieves the optimized and low power consumption by keeping the radio off as much as possible and sending small amounts of data at low transfer speeds. Another advantage of BLE is that it is enabled in most smartphones in the market.

One or more processors 1318 run various software components stored in medium 1302 to perform various functions for device 1300. In some embodiments, the software components include an operating system 1322, a communication module 1324 (or set of instructions), a location module 1326 (or set of instructions), a ranging module 1328 that is used as part of ranging operation described herein, and other application programs 1334 (or set of instructions).

Operating system 1322 can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 1324 facilitates communication with other devices over one or more external ports 1336 or via wireless circuitry 1308 and includes various software components for handling data received from wireless circuitry 1308 and/or external port 1336. External port 1336 (e.g., universal serial bus (USB), FireWire, Lightning connector, 60-pin connector, etc.) is adapted for coupling directly to other devices or indirectly over a network (e.g., the Internet, wireless LAN, etc.).

Location/motion module 1326 can assist in determining the current position (e.g., coordinates or other geographic location identifiers) and motion of device 1300. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1326 receives data from GPS unit 1348 and analyzes the signals to determine the current position of the mobile device. In some embodiments, location/motion module 1326 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1308 and is passed to location/motion module 1326. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1300 based on the position coordinates of the corresponding transmitters. Regardless of the specific location technology used, location/motion module 1326 receives information from which a location fix can be derived, interprets that information, and returns location information, such as geographic coordinates, latitude/longitude, or other location fix data Ranging module 1328 can send/receive ranging messages to/from an antenna, e.g., connected to wireless circuitry 1308. The messages can be used for various purposes, e.g., to identify a sending antenna of a device, determine timestamps of messages to determine a distance of mobile device 1300 from another device. Ranging module 1328 can exist on various processors of the device, e.g., an always-on processor (AOP), a UWB chip, and/or an application processor. For example, parts of ranging module 1328 can determine a distance on an AOP, and another part of the ranging module can interact with a sharing module, e.g., to display a position of the other device on a screen in order for a user to select the other device to share a data item. Ranging module 1328 can also interact with a reminder module that can provide an alert based on a distance from another mobile device.

The one or more applications 1334 on device 1300 can include any applications installed on the device 1300, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1306 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1306 can include a display and user input devices such as a keyboard, mouse, and/or trackpad. In some embodiments, I/O subsystem 1306 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1302) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1306 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1300 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed.

No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of coordinating communications among a group of mobile devices including a first mobile device, the group of mobile devices including three or more mobile devices, the method comprising performing, by the first mobile device:
   transmitting a request to establish ranging sessions with other mobile devices of the group of mobile devices;
   receiving from each of one or more of the other mobile devices in the group of mobile devices, a request to establish a ranging session with the other mobile device;
   detecting one or more redundant ranging sessions;
   identifying whether to keep or terminate at least one of the one or more redundant ranging sessions based on a criterion; and
   performing ranging using remaining ranging sessions with the other mobile devices.

2. The method of claim 1, wherein the criterion is a common criterion shared among the group of mobile devices.

3. The method of claim 2, wherein the common criterion comprises at least a portion an identifier for each of the group of mobile devices.

4. The method of claim 1, wherein the request to establish ranging sessions is used to synchronize response timeslots for the ranging sessions.

5. The method of claim 4, wherein the response timeslots are set at predetermined time intervals after transmission of the request to establish the ranging sessions.

6. The method of claim 1, wherein the one or more redundant ranging sessions comprises two or more symmetrical links between two mobile device the group of mobile devices.

7. A method of many-to-many communication techniques performed by a first mobile device, the method comprising:
storing a schedule specifying a transmission time for transmitting ranging packets;
designating response timeslots for receiving responses from two or more participating mobile devices;
transmitting ranging packets according to the schedule;
receiving two or more responses from the two or more participating mobile devices during the response timeslots;
transmitting a response to at least one of the two or more participating mobile devices;
determining a number of symmetrical communication links established between the participating mobile devices, wherein a symmetrical communication link is between the first mobile device and one of the participating mobile devices;
determining one or more redundant communication links of the symmetrical communication links established between the participating mobile devices, wherein a redundant communication link comprises a second symmetrical communication link between the first mobile device and the one of the participating mobile devices; and
terminating one of the one or more redundant communication links established between the first mobile device and one of the participating mobile devices.

8. The method of claim 7, wherein the response timeslots are set by predetermined time intervals after transmission of the ranging packets.

9. The method of claim 7, wherein the ranging packets contain timing information used to determine range between the participating mobile devices.

10. The method of claim 7, wherein a reception time of the ranging packets are used to calculate angle of arrival from the one or more responding mobile devices.

11. The method of claim 7, wherein a symmetrical communication link comprises one or more two-way data packet exchanges.

12. A non-transitory computer-readable medium storing a plurality of instructions that, when executed by one or more processors of a group of N mobile devices that includes other mobile devices, N being an integer of three or more, cause the one or more processors to perform operations comprising:
transmitting a request to establish ranging sessions with other mobile devices of the group of N mobile devices;
receiving from each of one or more other mobile device in the group of N mobile devices, a request to establish a ranging session with the other mobile device;
detecting one or more redundant ranging sessions;
identifying whether to keep or terminate at least one of the one or more redundant ranging sessions based on a criterion; and
performing ranging using remaining ranging sessions with the other mobile devices.

13. The non-transitory computer-readable medium of claim 12, wherein the criterion is a common criterion shared among the group of N mobile devices.

14. The non-transitory computer-readable medium of claim 13, wherein the common criterion comprises at least a portion an identifier for each of the group of N mobile devices.

15. The non-transitory computer-readable medium of claim 12, wherein the request to establish a ranging session is used to synchronize response slots for the ranging session.

16. The non-transitory computer-readable medium of claim 15, wherein the response slots are set at predetermined time intervals after transmission of the request to establish the ranging session.

17. The non-transitory computer-readable medium of claim 12, wherein the one or more redundant ranging sessions comprises two or more symmetrical links between two mobile device the group of N mobile devices.

18. The non-transitory computer-readable medium of claim 12, wherein a reception time of ranging packets in the ranging sessions is used to calculate an angle of arrival from one or more responding mobile devices.

19. The non-transitory computer-readable medium of claim 12, wherein the transmitting the request to establish ranging sessions is sent via Bluetooth Low Energy.

20. The non-transitory computer-readable medium of claim 12, wherein the ranging sessions are conducted via ultra-wideband wireless protocol.

* * * * *

UNITED STATES PATENT AND TRADEMARK OFFICE
CERTIFICATE OF CORRECTION

PATENT NO. : 11,622,243 B2  
APPLICATION NO. : 17/366933  
DATED : April 4, 2023  
INVENTOR(S) : Yagil Burowski et al.

Page 1 of 1

It is certified that error appears in the above-identified patent and that said Letters Patent is hereby corrected as shown below:

In the Claims

Column 38, Line 66: In Claim 3 replace "an identifier" with --of an identifier--  
Column 39, Line 9: In Claim 6 replace "device the group" with --devices in the group--  
Column 40, Line 24: In Claim 14 replace "an identifier" with --of an identifier--

Signed and Sealed this  
Fifth Day of September, 2023

Katherine Kelly Vidal  
*Director of the United States Patent and Trademark Office*